US012592738B2

(12) United States Patent
Manjunath

(10) Patent No.: US 12,592,738 B2
(45) Date of Patent: Mar. 31, 2026

(54) TRANSMITTER AND DRIVER ARCHITECTURES

(71) Applicant: Meta Platforms Technologies, LLC, Menlo Park, CA (US)

(72) Inventor: Sri Harsha Manjunath, Folsom, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 147 days.

(21) Appl. No.: 18/391,033

(22) Filed: Dec. 20, 2023

(65) Prior Publication Data

US 2024/0348278 A1 Oct. 17, 2024

Related U.S. Application Data

(60) Provisional application No. 63/495,902, filed on Apr. 13, 2023.

(51) Int. Cl.

| | |
|---|---|
| ***H04B 1/02*** | (2006.01) |
| ***H04B 1/40*** | (2015.01) |
| ***H04L 25/49*** | (2006.01) |

(52) U.S. Cl.
CPC ........... *H04B 1/40* (2013.01); *H04L 25/4917* (2013.01)

(58) Field of Classification Search
CPC . H04B 1/02; H04B 1/40; H04B 1/401; H04B 1/403; H04L 25/40; H04L 25/49; H04L 25/4906; H04L 25/4917
USPC .................................................. 327/108–112
See application file for complete search history.

(56) References Cited

U.S. PATENT DOCUMENTS

| | | | | |
|---|---|---|---|---|
| 6,271,709 | B1 * | 8/2001 | Kimura | H03K 17/168 327/434 |
| 10,573,358 | B2 | 2/2020 | Butterfield | |
| 10,848,153 | B2 | 11/2020 | Akamatsu et al. | |
| 11,443,785 | B2 | 9/2022 | Lee et al. | |
| 12,425,048 | B1 * | 9/2025 | Jiang | H03M 9/00 |
| 2013/0027092 | A1 * | 1/2013 | Bien | H03K 19/017509 327/109 |
| 2021/0028597 | A1 | 1/2021 | Abdelhalim et al. | |
| 2022/0147482 | A1 | 5/2022 | Kim et al. | |

* cited by examiner

*Primary Examiner* — Hai L Nguyen
(74) *Attorney, Agent, or Firm* — Morgan, Lewis & Bockius LLP

(57) ABSTRACT

An apparatus may include an input, an output, a current source, a first switch configured to electrically couple the current source to the output, a current sink, a second switch configured to electrically couple the current sink to the output, and a driver configured to modulate states of the output to reflect states of the input by: detecting a first input state of the input, changing the output to a first output state corresponding to the first input state of the input by electrically coupling, via the first switch, the current source to the output, detecting a second input state of the input; and changing the output from the first output state to a second output state corresponding to the second input state of the input by electrically coupling, via the second switch, the current sink to the output. Various other apparatuses, systems, and methods are also disclosed.

20 Claims, 19 Drawing Sheets

1010

Detect a first input state of an input of the transmitter

1020

Change the output to a first output state corresponding to the first input state of the input by electrically coupling, via a first switch, a current source to the output

1030

Detect a second input state of the input

1040

Change the output to a second output state corresponding to the second input state of the input by electrically coupling, via a second switch, a current sink to the output

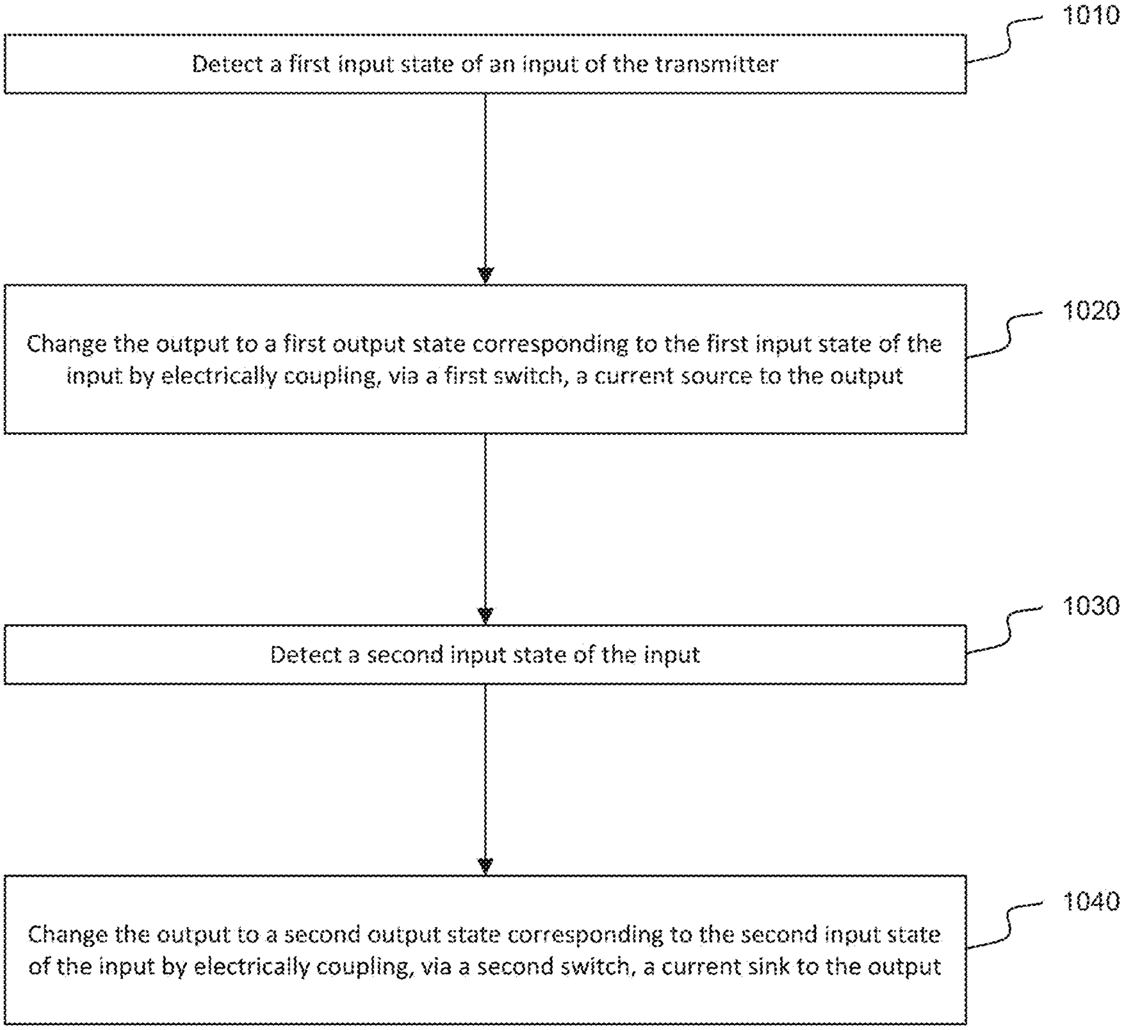

*FIG. 10*

TRANSMITTER AND DRIVER ARCHITECTURES

CROSS REFERENCE TO RELATED APPLICATION

This application claims the benefit of U.S. Provisional Application No. 63/495,902, filed 13 Apr. 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 10 is a flow diagram of an exemplary method for modulating states of a transmitter's output according to embodiments of this disclosure.

Figure 1A:
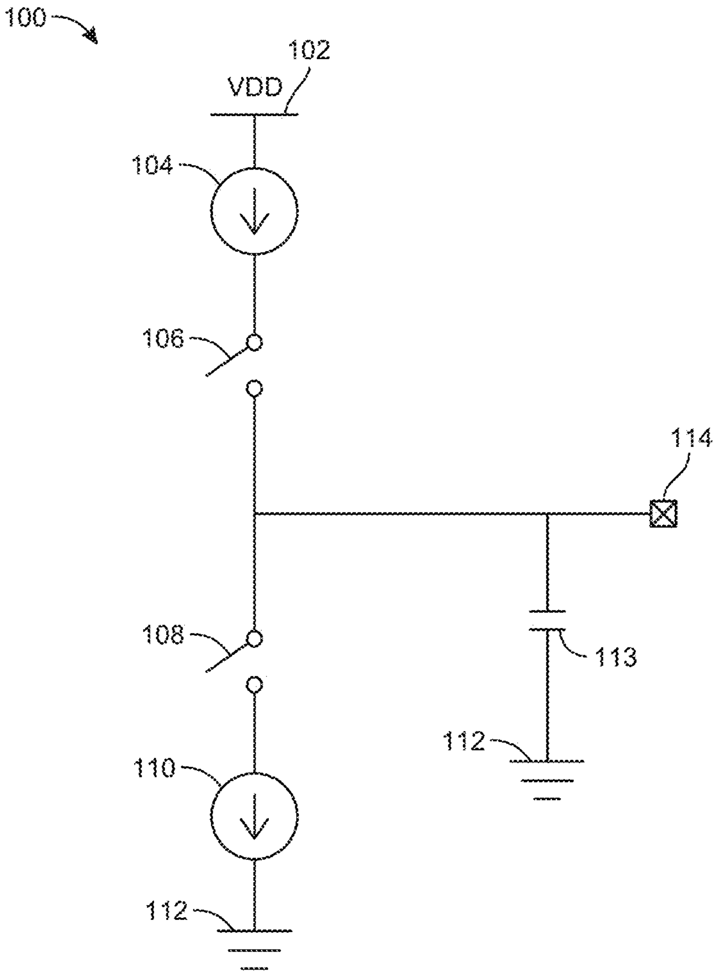
FIG. 1A is a circuit diagram of an example transmitter circuit according to embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

In the realm of transmitter designs, particularly for short die-to-die interconnects, a prevalent challenge is the excessive power consumption and the potential necessity for terminated receivers. This situation demands innovative solutions to optimize efficiency and compatibility in advanced electronic systems.

The present disclosure is generally directed to transmitter circuits and corresponding driver architectures. The disclosed transmitter circuits and corresponding driver architectures may be optimized for ultra-low power short-reach (e.g., less than 10 mm) interface (like in die-to-die) applications. Embodiments of this disclosure may include Source-Series Terminated (SST) Pulse Amplitude Modulation (PAM) driver architectures that may consume considerably less power compared to traditional driver architectures, especially with architectures having unterminated receivers. In some embodiments, at least a portion of the power savings provided by the disclosed designs may come from a lack of short-circuit current paths. Embodiments of the present disclosure may be used for single polarity PAM or double polarity PAM and/or may enable any number of discrete pulse amplitudes (e.g., PAM4, PAM8, PAM16, etc.).

The present disclosure presents 4-level PAM as a representative example. However, the design principles and technical approaches detailed in this disclosure provide a flexible framework that can be applied to develop transmitter and driver circuits capable of supporting different numbers of PAM levels. This flexibility enables customization to specific requirements or applications, ensuring versatility and suitability across diverse scenarios with varying PAM levels. The modifiable nature of the disclosed circuits actively underscores the wide applicability of the principles and methods detailed in this disclosure.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-10, detailed descriptions of transmitter and driver circuitries and architectures. With reference to FIGS. 11-19, the following will provide detailed descriptions of various extended-reality systems and components that may implement embodiments of the present disclosure.

FIG. 1A is a circuit diagram of an example transmitter circuit 100 for transmitting a pulse-amplitude modulated output signal to a receiver such as an unterminated receiver. The circuit diagrams included herein are intended to exemplify the conceptual framework and operational logic of exemplary circuits. In some cases, the circuit diagrams presented herein may not be exhaustive and/or may omit ancillary components and connections that could be present in a comprehensive, practical circuit design. Additional elements such as passive or active components, interconnections, and interface mechanisms such as ESD protection or termination resistors, although not illustrated, may be included within a design's architecture without departing from the spirit and scope of the present disclosure. Such supplementary features, while not depicted, may be considered as part of the broader scope of the circuit designs herein described.

As shown in FIG. 1A, transmitter circuit 100 may include a positive-supply voltage 102, a current source 104, a signal-controlled switch 106, a signal-controlled switch 108, a current sink 110, a ground 112, a capacitive element 113, and an output 114. In this example, signal-controlled switch 106 may couple or decouple current source 104 to or from output 114 responsive to control signaling, signal-controlled switch 108 may couple or decouple current sink 110 to or from output 114 responsive to control signaling, and output 114 may be coupled through a transmission channel to a receiver (e.g., an unterminated receiver). In some examples, capacitive element 113 may represent or include one or more capacitors that may be charged or discharged via current source 104 or current sink 110 to vary the amplitude of a signal at output 114. Additionally or alternatively, capacitive elements 113 may represent a capacitance of one or more elements of transmitter circuit 100 that may enable output 114 to be charged or discharged via current source 104 or current sink 110 to vary the amplitude of a signal at output 114.

Figure 1B:
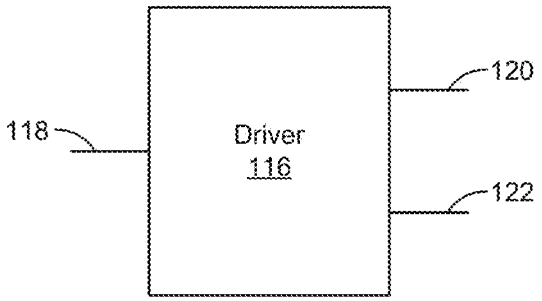
FIG. 1B is a block diagram of an example transmitter driver for controlling elements of the transmitter circuit of FIG. 1A according to embodiments of this disclosure.

FIG. 1B is a block diagram of an example driver 116 for controlling signal-controlled switches 106 and 108. Driver 116 may modulate the amplitude of a signal on output 114 according to a signal received via an input 118 by varying signals on control output 120, which may control signal-controlled switch 106, and control output 122, which may control signal-controlled switch 108. In the 4-level PAM examples described herein, input 118 may represent a 2-bit input.

In some examples, driver 116 may close signal-controlled switch 106 in order to couple current source 104 to output 114 and increase the amplitude of the signal at output 114. Similarly, driver 116 may close signal-controlled switch 108 in order to couple current sink 110 to output 114 and decrease the amplitude of the signal at output 114.

Figure 2:
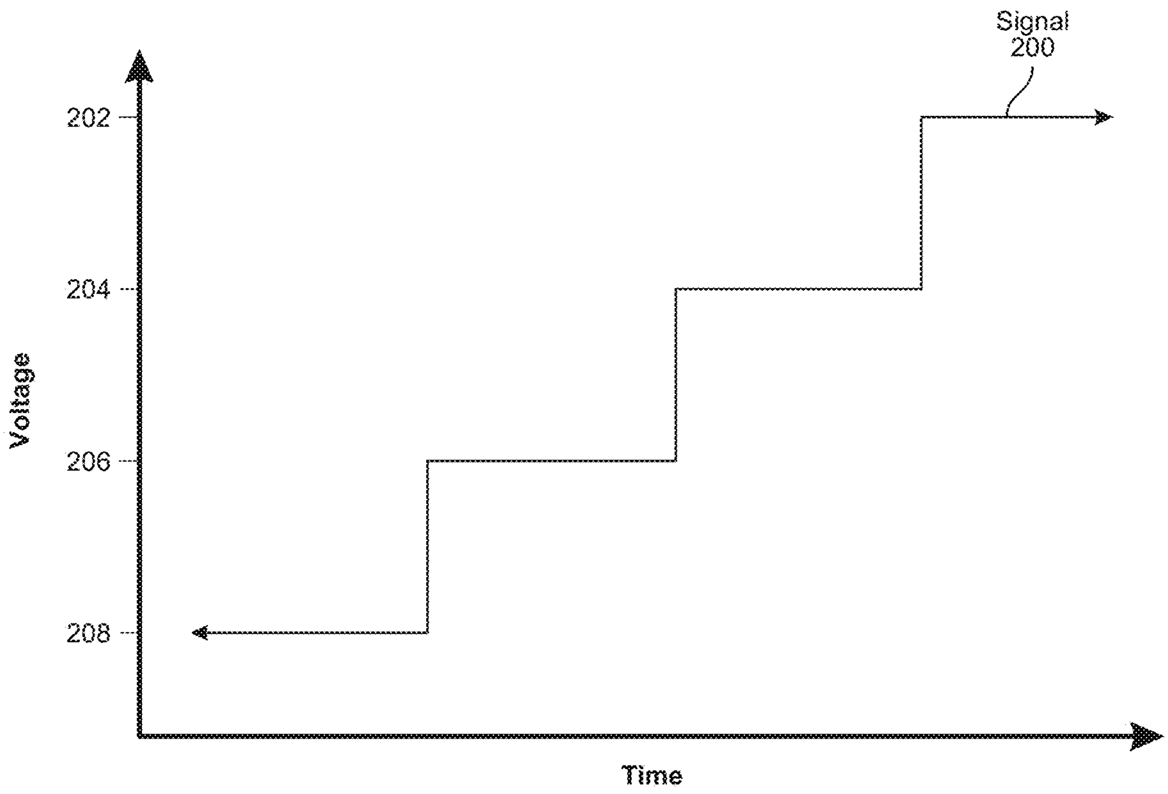
FIG. 2 is an illustration of an exemplary amplitude-modulated data signal according to embodiments of this disclosure.

FIG. 2 presents an illustration of an exemplary amplitude-modulated data signal 200 that may be utilized to convey data. Specifically, in this instance, different amplitude levels may represent distinct binary data values. For example, an amplitude level 202 may represent a binary value 11 and correspond to an amplitude equal to a positive-supply voltage like Vdd, Similarly, amplitude level 204 may represent a binary value 10 and correspond to an amplitude equal to two-thirds of the positive-supply voltage. Moreover, amplitude level 206 may represent a binary value 01 and correspond to an amplitude equal to one-third of the positive supply voltage. Lastly, amplitude level 208 may represent a binary value 00 and may correspond to a zero-level amplitude. This framework illustrated in FIG. 2 allows for the inclusion of additional levels for use in, for example, 6-level PAM or 8-level PAM.

In some examples, current source 104 and current sink 110 may provide or sink constant or otherwise predictable currents, and driver 116 may close and open signal-controlled switches 104 and 108 for durations suitable to charge or discharge output 114 from one amplitude state to another.

Figure 3:
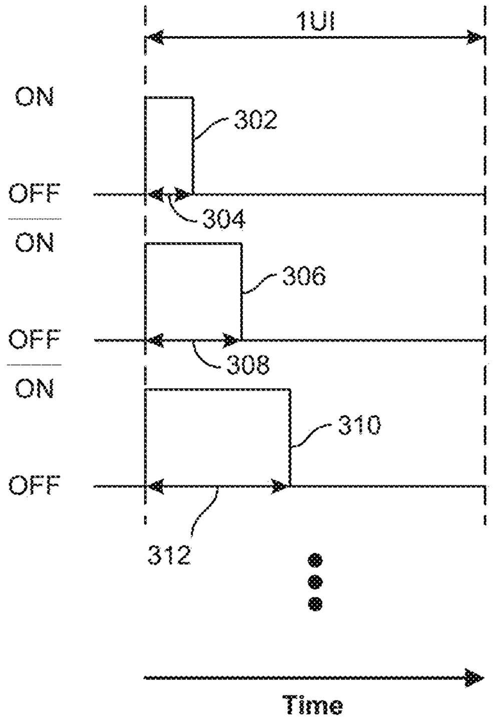
FIG. 3 is an illustration of exemplary pulsed control signals according to embodiments of this disclosure.

FIG. 3 presents exemplary pulsed control signals that driver 116 may output on control output 120 or 122 to control signal-controlled switches 106 or 108, respectively. In one example, control signal 302 may represent a control signal with which driver 116 may close signal-controlled switches 106 or 108 to transition signal 200 between amplitudes 202 and 204, amplitudes 204 and 206, and/or amplitudes 206 and 208. In this example, control signal 302 may have an on duration 304 sufficient to allow current source 104 or current sink 110 to charge or discharge output 114 between amplitudes 202 and 204, amplitudes 204 and 206, and/or amplitudes 206 and 208. In another example, control signal 306 may represent a control signal with which driver 116 may close signal-controlled switches 106 or 108 for a time period sufficient to transition signal 200 between amplitudes 202 and 206 and/or amplitudes 204 and 208. In this example, control signal 306 may have an on duration 308 sufficient to allow current source 104 or current sink 110 sufficient time to charge or discharge output 114 between amplitudes 202 and 206 and/or amplitudes 204 and 208. In another example, control signal 310 may represent a control signal with which driver 116 may close signal-controlled switches 106 or 108 for a time period sufficient to transition signal 200 between amplitudes 202 and 208. In this example, control signal 310 may have an on duration 312 sufficient to allow current source 104 or current sink 110 sufficient time to charge or discharge output 114 between amplitudes 202 and 208.

Figure 4:
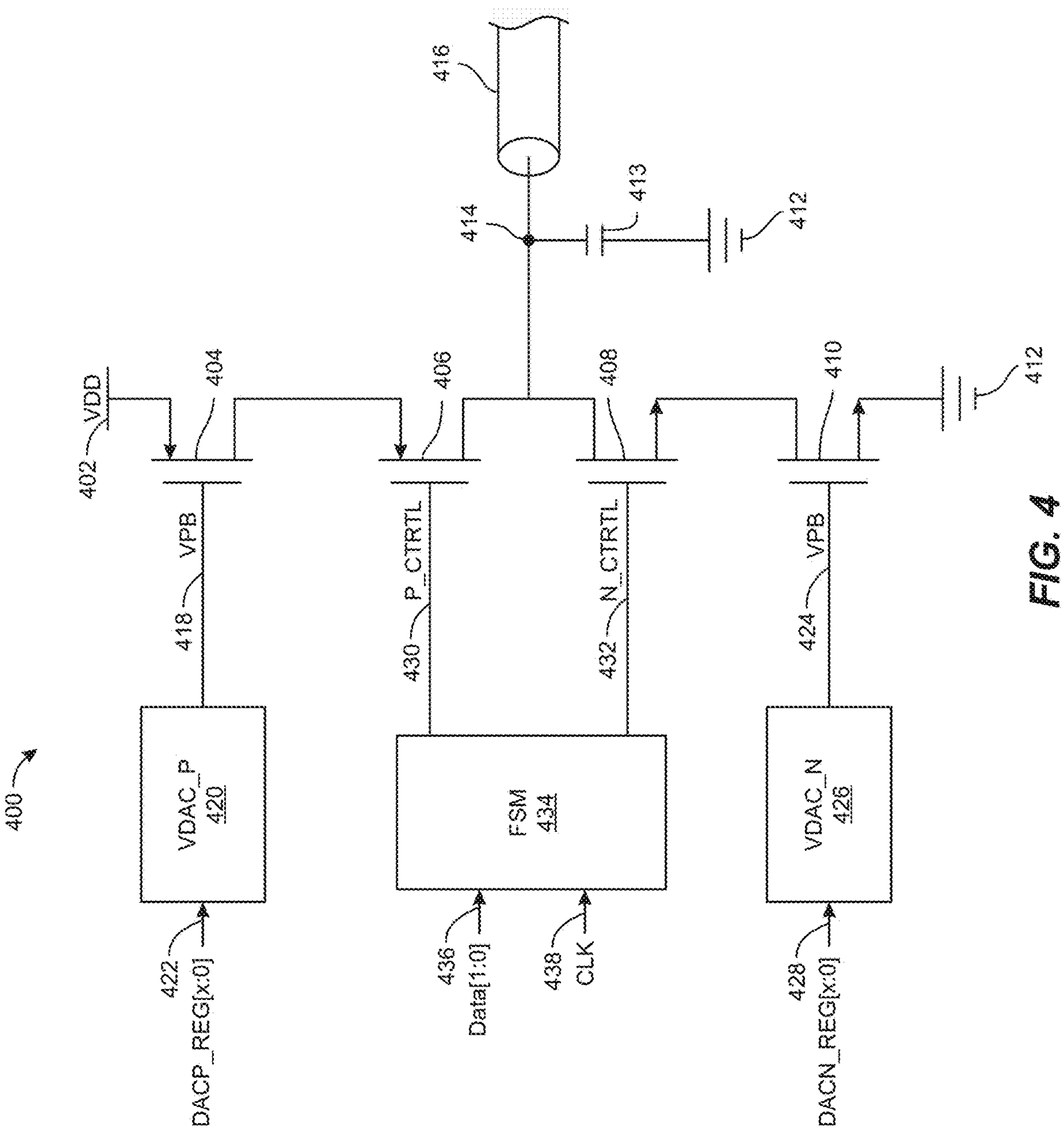
FIG. 4 is a circuit diagram of an example transmitter circuit and corresponding driver according to embodiments of this disclosure.

FIG. 4 is a circuit diagram of an example transmitter circuit 400 for transmitting a pulse-amplitude modulated output signal such as signal 200 in FIG. 2 to a receiver. As shown in FIG. 4, transmitter circuit 400 may include a positive-supply voltage 402, a transistor 404, a transistor 406, a transistor 408, a transistor 410, a ground 412, a capacitive element 413, and an output 414. In this example, output 414 may be coupled to a receiver (e.g., an unterminated receiver) via a transmission line 416. In some examples, transistors 404 and 406 may represent or include p-type transistors such as p-type metal-oxide-semiconductor field-effect transistors (MOSFETs), and transistors 408 and 410 may represent or include n-type transistors such as n-type MOSFETs.

In some examples, transmitter circuit 400 may include a digital-to-analog converter 420 coupled to a gate 418 of transistor 404 and a digital-to-analog converter 426 coupled to a gate 424 of transistor 410. Digital-to-analog converter 420 may be calibrated or tuned via an input 422 to apply a pre-bias voltage to gate 418 of transistor 404 to control an amount of current flowing through transistor 404 and/or a charging rate of output 414 when transistor 404 is coupled to output 414 via transistor 406. Digital-to-analog converter 426 may also be calibrated or tuned via an input 428 to apply a pre-bias voltage to gate 424 of transistor 410 to control an amount of current flowing through transistor 410 and/or discharging rate of output 414 when transistor 410 is coupled to output 414 via transistor 410. As shown, transistor 404 and digital-to-analog converter 420 may act together as a current source for charging output 414, and transistor 410 and digital-to-analog converter 426 may act together as a current sink for discharging output 414.

In transmitter circuit 400, transistor 406 may act as a first signal-controlled switch to couple or decouple transistor 404 to or from output 414 responsive to control signaling applied to a gate 430 of transistor 406. Likewise, transistor 408 may act as a first signal-controlled switch to couple or decouple transistor 410 to or from output 414 responsive to control signaling applied to a gate 432 of transistor 408. In some examples, capacitive element 413 may represent or include one or more capacitors that may be charged or discharged via transistor 404 or transistor 410 to vary the amplitude of a signal at output 414. Additionally or alternatively, capacitive elements 413 may represent a capacitance of one or more elements of transmitter circuit 400 that may enable output 414 to be charged or discharged via transistor 404 or transistor 410 to vary the amplitude of a signal at output 414.

Transmitter circuit 400 may include a finite-state-machine (FSM) driver 434 configured to apply control signaling to gates 430 and 432 of transistors 406 and 408, respectively. FSM driver 434 may modulate the amplitude of a signal on output 414 according to a signal received via an input 436 by varying signals on control output 430, which may control transistor 406, and control output 432, which may control transistor 408. In the 4-level PAM examples described herein, input 436 may represent a 2-bit input. In some examples, FSM driver 434 may include a clock input 438 through which state transitions may be triggered.

In some examples, FSM driver 434 may close transistor 406 in order to couple transistor 404 to output 414 and increase the amplitude of the signal at output 414. Similarly, FSM driver 434 may close transistor 408 in order to couple transistor 410 to output 414 and decrease the amplitude of the signal at output 414. In some examples, transistors 404 and 410 may be calibrated or tuned to provide or sink constant or otherwise predictable currents, and FSM driver 434 may close and open transistors 406 and 408 for calibrated durations suitable to charge or discharge output 414 from one amplitude state to another.

Figure 5:
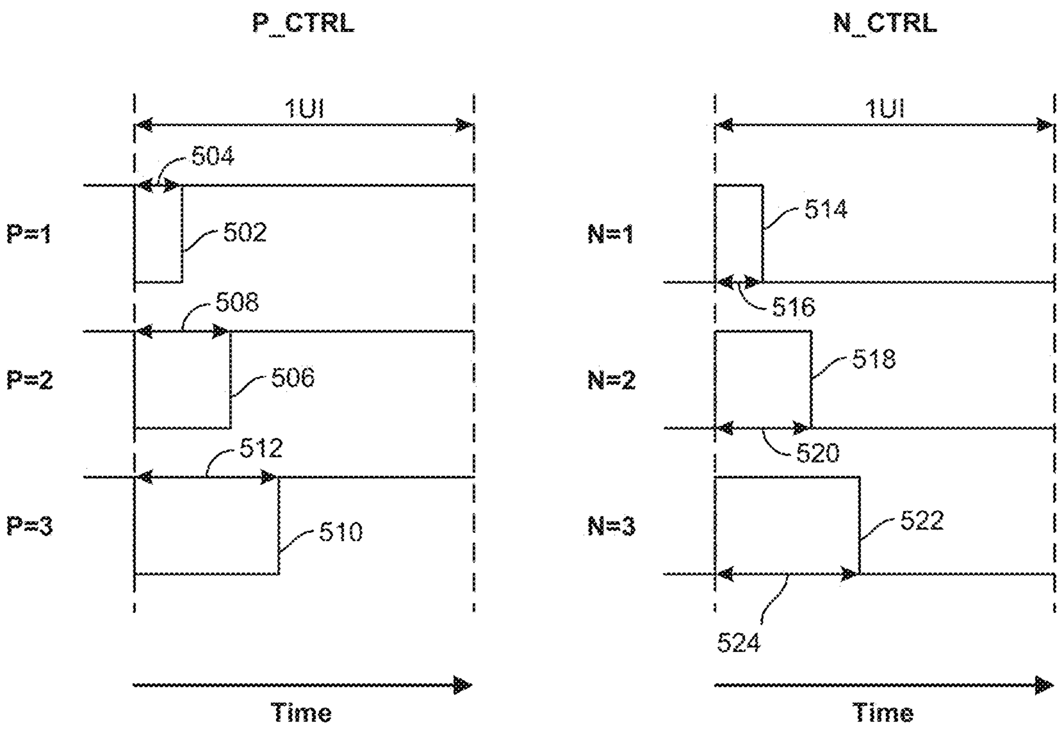
FIG. 5 is an illustration of exemplary pulsed control signals according to embodiments of this disclosure.

FIG. 5 presents exemplary pulsed control signals that FSM driver 434 may apply to gates 430 and 432 to control transistors 406 or 408, respectively, and modulate a signal on output 414. Using signal 200 in FIG. 2 as an example, FSM driver 434 may respectively apply control signals 502 and 514 to close transistors 406 or 408 to transition signal 200 between amplitudes 202 and 204, amplitudes 204 and 206, and/or amplitudes 206 and 208. Control signal 502 may have a pulse duration 504 calibrated to allow a current supplied by transistor 404 to charge output 414 from amplitude 208 to amplitude 206, from amplitude 206 to amplitude 204, and/or from amplitude 204 to amplitude 202. Control signal 514 may likewise have a pulse duration 516 calibrated to allow a current sinked by transistor 410 to discharge output 414 from amplitude 202 to amplitude 204, from amplitude 204 to amplitude 206, and/or from amplitude 206 to amplitude 208.

FSM driver 434 may respectively apply control signals 506 and 518 to transition signal 200 between amplitudes 202 and 206 and/or amplitudes 204 and 208. Control signal 506 may have a pulse duration 508 calibrated to allow a current supplied by transistor 404 to charge output 414 from amplitude 208 to 204 and/or from amplitude 206 to amplitude 202. Control signal 518 may similarly have a pulse duration 520 calibrated to allow a current sinked by transistor 410 to discharge output 414 from amplitude 202 to 206 and/or from amplitude 204 to amplitude 208.

FSM driver 434 may respectively apply control signals 510 and 522 to close transistors 406 or 408 to transition signal 200 between amplitudes 202 and 208. Control signal 510 may have a pulse duration 512 calibrated to allow a current supplied by transistor 404 to charge output 414 from amplitude 208 to amplitude 202. Control signal 522 may likewise have a pulse duration 524 calibrated to allow a current sinked by transistor 410 to discharge output 414 from amplitude 202 to amplitude 208. When a change to the signal on output 414 is not needed, FSM driver 434 may apply a constant high control signal and a constant low control signal to transistor 406 and transistor 408, respectively.

Figure 6:
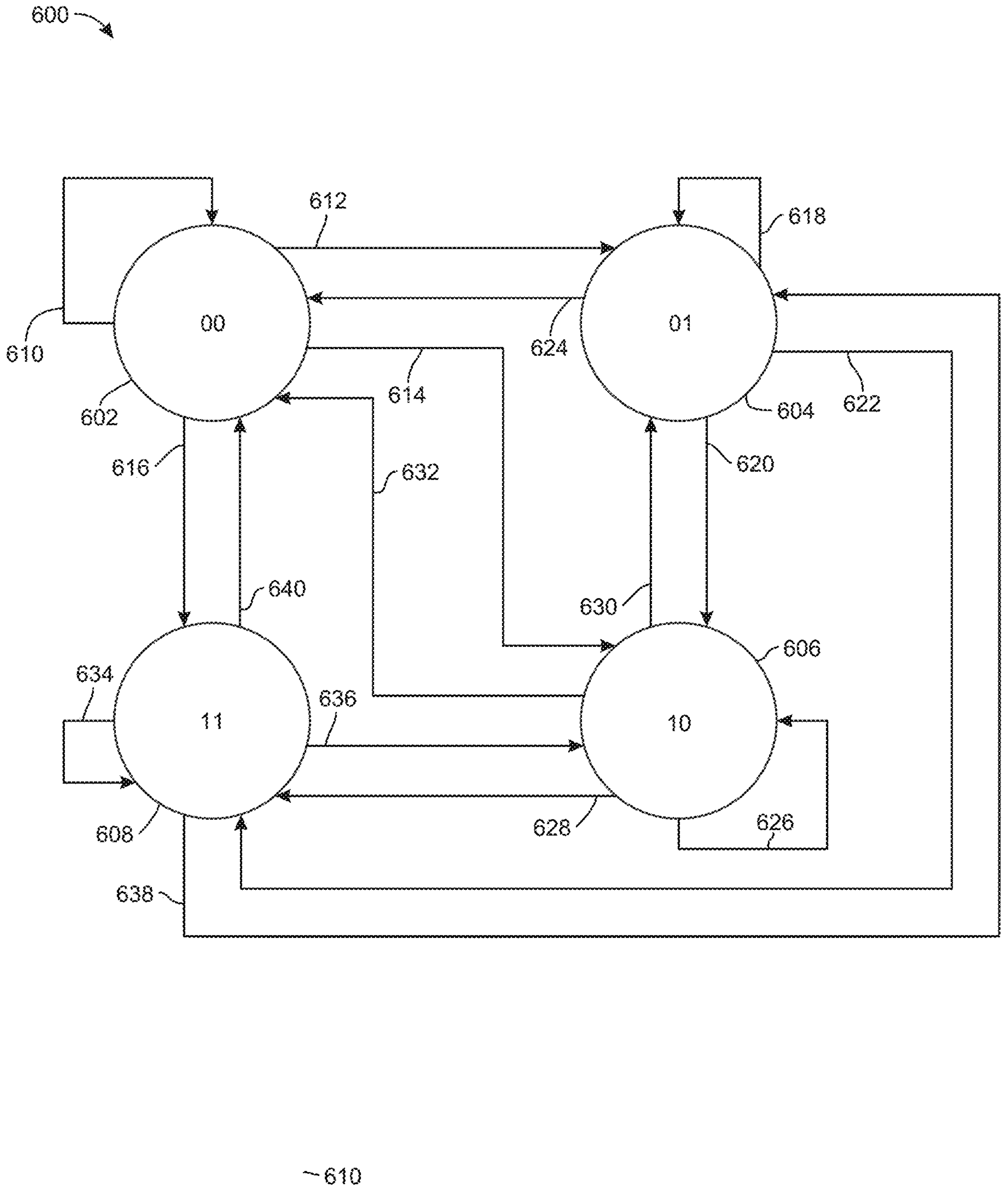
FIG. 6 is an illustration of an exemplary finite-state machine for controlling a transmitter circuit according to embodiments of this disclosure.

FIG. 6 is an illustration of an exemplary finite-state machine 600 of FSM driver 434. As shown, exemplary finite-state machine 600 may include 4 states: a state 602, a state 604, a state 606, and a state 608 that represent four possible levels of a 4-level PAM output signal. FSM driver 434 may be triggered by a clock signal applied to clock input 438 to transition from one state of finite-state machine 600 to another and apply control signals to gates 430 and 432 of transistors 406 and 408 based on a state of an input signal applied to input 436 as will be described in greater detail below. As mentioned throughout this disclosure, 4-level PAM is one of many possible embodiments of the present disclosure, and the disclosed transmitter and driver circuits may be modified to transmit any number of PAM levels using the methods and techniques disclosed herein.

State 602 may represent a first or lowest output state of a signal on output 414 (e.g., 00) corresponding to a first or lowest input state of a signal on input 436 (e.g., 00). When triggered by a clock signal on clock input 438, FSM driver 434 may take one of four transitions from state 602 and may apply control signaling based on the input signal on input 436. For example, FSM driver 434 may take a transition 610 from state 602 to state 602 when the signal on input 436 has remained 00. During transition 610, FSM driver 434 may apply a constant high control signal and a constant low control signal to transistor 406 and transistor 408, respectively. FSM driver 434 may take a transition 612 from state 602 to state 604 when the signal on input 436 has transitioned from 00 to 01. During transition 612, FSM driver 434 may apply control signal 502 to gate 430 of transistor 406 while applying a constant low control signal to gate 432 of transistor 408 such that output 414 is charged by a current supplied by transistor 404 from an amplitude representing 00 to an amplitude representing 01 and no discharging occurs through transistor 408. FSM driver 434 may take a transition 614 from state 602 to state 606 when the signal on input 436 has transitioned from 00 to 10. During transition 614, FSM driver 434 may apply control signal 506 to gate 430 of transistor 406 while applying a constant low control signal to gate 432 of transistor 408 such that output 414 is charged by a current supplied by transistor 404 from an amplitude representing 00 to an amplitude representing 10 and no discharging occurs through transistor 408. FSM driver 434 may take a transition 616 from state 602 to state 608 when the signal on input 436 has transitioned from 00 to 11. During transition 616, FSM driver 434 may apply control signal 510 to gate 430 of transistor 406 while applying a constant low control signal to gate 432 of transistor 408 such that output 414 is charged by a current supplied by transistor 404 from an amplitude representing 00 to an amplitude representing 11 and no discharging occurs through transistor 408.

State 604 may represent a second or second lowest output state of a signal on output 414 (e.g., 01) corresponding to a second or second lowest input state of a signal on input 436 (e.g., 01). When triggered by a clock signal on clock input 438, FSM driver 434 may take one of four transitions from state 604 and may apply control signaling based on the input signal on input 436. For example, FSM driver 434 may take a transition 618 from state 604 to state 604 when the signal on input 436 has remained 01. During transition 618, FSM driver 434 may apply a constant high control signal and a constant low control signal to transistor 406 and transistor 408, respectively. FSM driver 434 may take a transition 620 from state 604 to state 606 when the signal on input 436 has transitioned from 01 to 10. During transition 620, FSM driver 434 may apply control signal 502 to gate 430 of transistor 406 while applying a constant low control signal to gate 432 of transistor 408 such that output 414 is charged by a current supplied by transistor 404 from an amplitude representing 01 to an amplitude representing 10 and no discharging occurs through transistor 408. FSM driver 434 may take a transition 622 from state 604 to state 608 when the signal on input 436 has transitioned from 01 to 11. During transition 612, FSM driver 434 may apply control signal 506 to gate 430 of transistor 406 while applying a constant low control signal to gate 432 of transistor 408 such that output 414 is charged by a current supplied by transistor 404 from an amplitude representing 01 to an amplitude representing 11 and no discharging occurs through transistor 408. FSM driver 434 may take a transition 624 from state 604 to state 602 when the signal on input 436 has transitioned from 01 to 00. During transition 624, FSM driver 434 may apply control signal 514 to gate 432 of transistor 408 while applying a constant high control signal to gate 430 of transistor 406 such that output 414 is discharged by a current sinked by transistor 410 from an amplitude representing 01 to an amplitude representing 00 and no charging occurs through transistor 406.

State 606 may represent a third or third lowest output state of a signal on output 414 (e.g., 10) corresponding to a third or third lowest input state of a signal on input 436 (e.g., 10). When triggered by a clock signal on clock input 438, FSM driver 434 may take one of four transitions from state 606 and may apply control signaling based on the input signal on input 436. For example, FSM driver 434 may take a transition 626 from state 606 to state 606 when the signal on input 436 has remained 10. During transition 626, FSM driver 434 may apply a constant high control signal and a constant low control signal to transistor 406 and transistor 408, respectively. FSM driver 434 may take a transition 628 from state 606 to state 608 when the signal on input 436 has transitioned from 10 to 11. During transition 628, FSM driver 434 may apply control signal 502 to gate 430 of transistor 406 while applying a constant low control signal to gate 432 of transistor 408 such that output 414 is charged by a current supplied by transistor 404 from an amplitude representing 10 to an amplitude representing 11 and no discharging occurs through transistor 408. FSM driver 434 may take a transition 630 from state 606 to state 604 when the signal on input 436 has transitioned from 10 to 01. During transition 630, FSM driver 434 may apply control signal 514 to gate 432 of transistor 408 while applying a constant high control signal to gate 430 of transistor 406 such that output 414 is discharged by a current sinked by transistor 410 from an amplitude representing 10 to an amplitude representing 01 and no charging occurs through transistor 406. FSM driver 434 may take a transition 632 from state 606 to state 602 when the signal on input 436 has transitioned from 10 to 00. During transition 632, FSM driver 434 may apply control signal 518 to gate 432 of transistor 408 while applying a constant high control signal to gate 430 of transistor 406 such that output 414 is discharged by a current sinked by transistor 410 from an amplitude representing 10 to an amplitude representing 00 and no charging occurs through transistor 406.

State 608 may represent a fourth or highest output state of a signal on output 414 (e.g., 11) corresponding to a fourth or highest input state of a signal on input 436 (e.g., 11). When triggered by a clock signal on clock input 438, FSM driver 434 may take one of four transitions from state 608 and may apply control signaling based on the input signal on input 436. For example, FSM driver 434 may take a transition 634 from state 608 to state 608 when the signal on input 436 has remained 11. During transition 634, FSM driver 434 may apply a constant high control signal and a constant low control signal to transistor 406 and transistor 408, respectively. FSM driver 434 may take a transition 636 from state 608 to state 606 when the signal on input 436 has transitioned from 11 to 10. During transition 636, FSM driver 434 may apply control signal 514 to gate 432 of transistor 408 while applying a constant high control signal to gate 430 of transistor 406 such that output 414 is discharged by a current sinked by transistor 410 from an amplitude representing 11 to an amplitude representing 10 and no charging occurs through transistor 406. FSM driver 434 may take a transition 638 from state 608 to state 604 when the signal on input 436 has transitioned from 11 to 01. During transition 638, FSM driver 434 may apply control signal 518 to gate 432 of transistor 408 while applying a constant high control signal to gate 430 of transistor 406 such that output 414 is discharged by a current sinked by transistor 410 from an amplitude representing 11 to an amplitude representing 01 and no charging occurs through transistor 406. FSM driver 434 may take a transition 640 from state 608 to state 602 when the signal on input 436 has transitioned from 11 to 00. During transition 634, FSM driver 434 may apply control signal 522 to gate 432 of transistor 408 while applying a constant high control signal to gate 430 of transistor 406 such that output 414 is discharged by a current sinked by transistor 410 from an amplitude representing 11 to an amplitude representing 00 and no charging occurs through transistor 406.

Figure 7A:
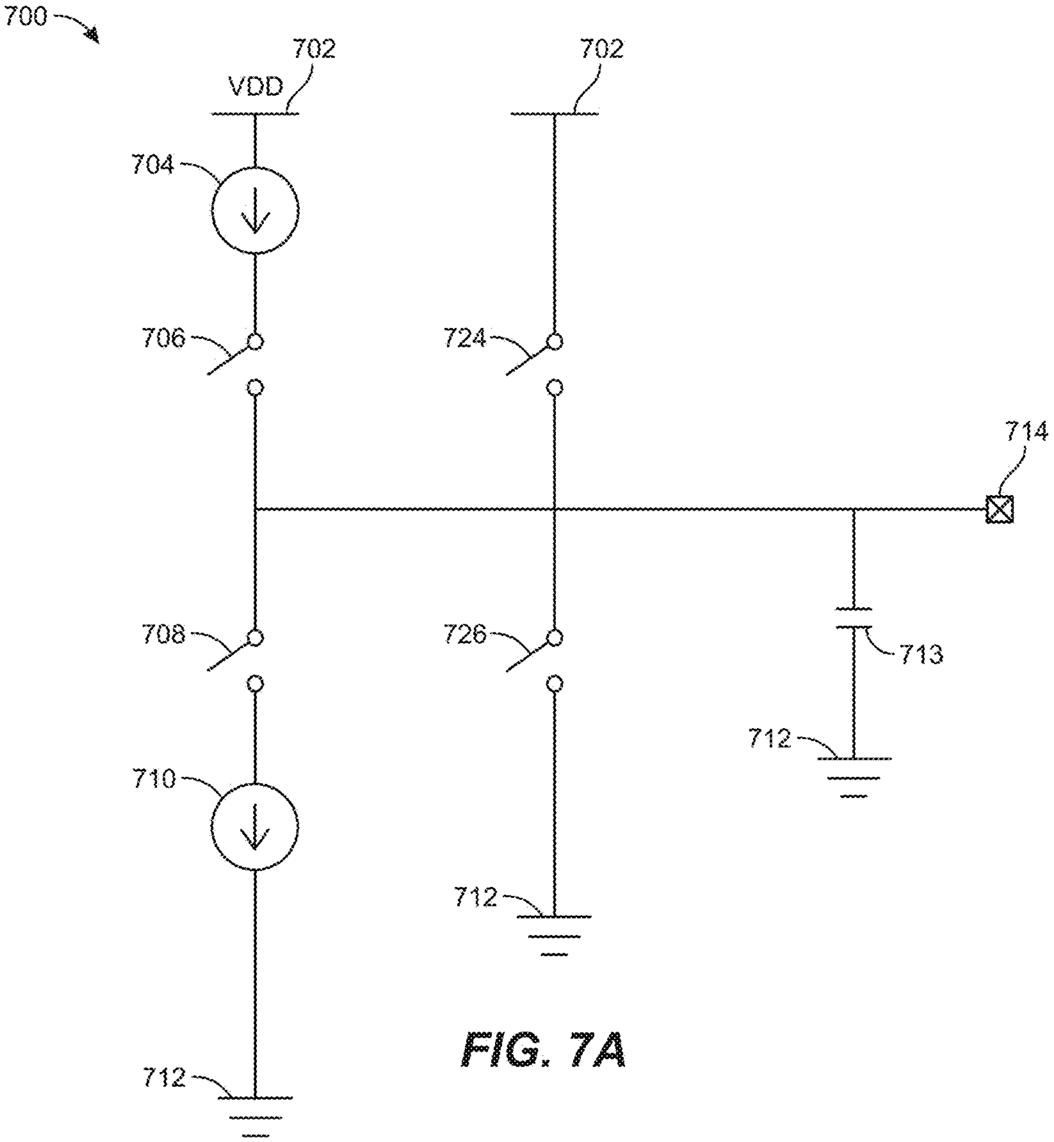
FIG. 7A is a circuit diagram of another example transmitter circuit according to embodiments of this disclosure.

FIG. 7A is a circuit diagram of another example transmitter circuit 700 for transmitting a pulse-amplitude modulated output signal to a receiver such as an unterminated receiver. As shown in FIG. 7A, transmitter circuit 700 may include a positive-supply voltage 702, a current source 704, a first signal-controlled switch 706, a second signal-controlled switch 708, a current sink 710, a ground 712, a third signal-controlled switch 724, a fourth signal-controlled switch 726, a capacitive element 713, and an output 714. In this example, signal-controlled switch 706 may couple or decouple current source 704 to or from output 714 responsive to control signaling, signal-controlled switch 708 may couple or decouple current sink 710 to or from output 714 responsive to control signaling, signal-controlled switch 724 may couple or decouple positive-supply voltage 702 to or from output 714, signal-controlled switch 726 may couple or decouple ground 712 to or from output 714, and output 714 may be coupled through a transmission channel to a receiver (e.g., an unterminated receiver). In some examples, capacitive element 713 may represent or include one or more capacitors that may be charged or discharged via current source 704, current sink 710, positive-supply voltage 702, or ground 712 to vary the amplitude of a signal at output 714. Additionally or alternatively, capacitive elements 713 may represent a capacitance of one or more elements of transmitter circuit 700 that may enable output 714 to be charged or discharged via current source 704, current sink 710, positive-supply voltage 702, or ground 712 to vary the amplitude of a signal at output 714.

Figure 7B:
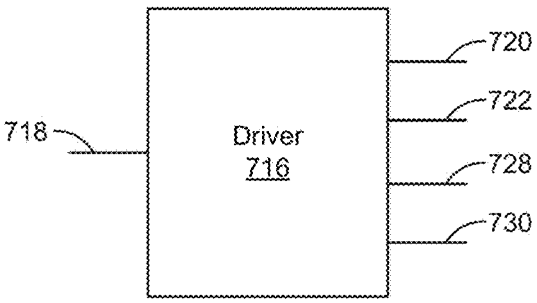
FIG. 7B is a block diagram of another example transmitter driver for controlling elements of the transmitter circuit of FIG. 7A according to embodiments of this disclosure.

FIG. 7B is a block diagram of an example driver 716 for controlling signal-controlled switches 706, 708, 724, and 726. Driver 716 may modulate the amplitude of a signal on output 714 according to a signal received via an input 718 by varying signals on control output 720, which may control signal-controlled switch 706, control output 722, which may control signal-controlled switch 708, control output 728, which may control signal-controlled switch 724, and/or control output 730, which may control signal-controlled switch 726. In the 4-level PAM examples described herein, input 718 may represent a 2-bit input.

In some examples, driver 716 may close signal-controlled switch 706 in order to couple current source 704 to output 714 and increase the amplitude of the signal at output 714. Similarly, driver 716 may close signal-controlled switch 708 in order to couple current sink 710 to output 714 and decrease the amplitude of the signal at output 714. In some examples, current source 704 and current sink 710 may provide or sink constant or otherwise predictable currents, and driver 716 may close and open signal-controlled switches 704 and 708 for durations suitable to charge or discharge output 714 from one amplitude state to another. Signal-controlled switches 706 and 708 are similar to signal-controlled switches 106 and 108 in FIG. 1. Therefore, the previously provided descriptions of signal-controlled switches 106 and 108 may also apply to signal-controlled switches 706 and 708.

In some examples, driver 716 may close signal-controlled switch 724 in order to couple output 714 to positive-supply voltage 702 and thus increase the amplitude of the signal at output 714 to the level of positive-supply voltage 702 (e.g., amplitude level 202 of signal 200 in FIG. 2). Similarly, driver 716 may close signal-controlled switch 726 in order to couple output 714 to ground 712 and thus decrease the amplitude of the signal at output 714 to the level of ground 712 (e.g., amplitude level 208 of signal 200 in FIG. 2). Signal-controlled switches 724 and 726 may enable driver 716 to periodically charge or discharge output 714 to consistent and known amplitudes such that any errors in charging or discharging via current source 704 and current sink 710 may be minimized.

Figure 8:
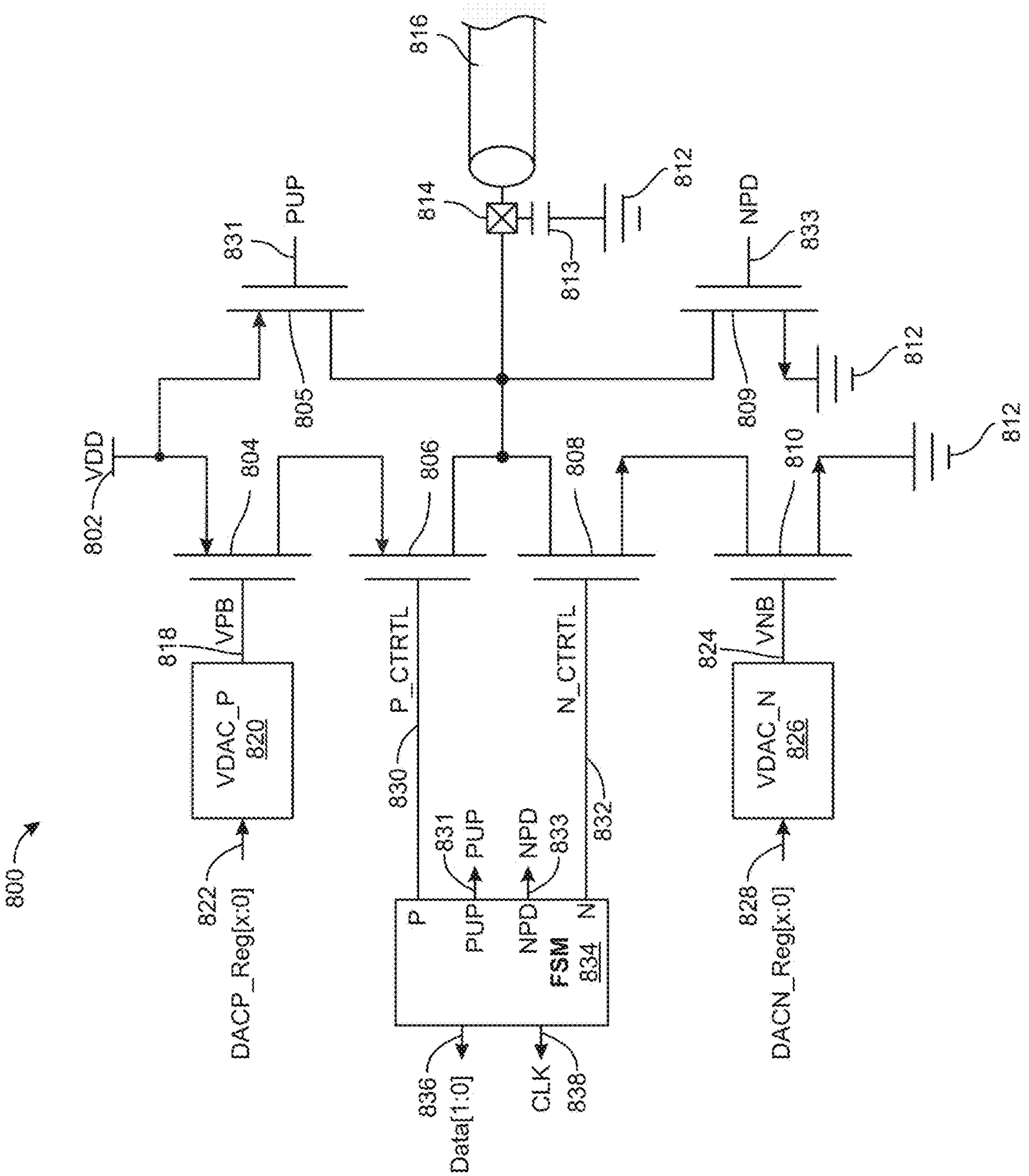
FIG. 8 is a circuit diagram of an example transmitter circuit and corresponding driver according to embodiments of this disclosure.

FIG. 8 is a circuit diagram of an example transmitter circuit 800 for transmitting a pulse-amplitude modulated output signal such as signal 200 in FIG. 2 to a receiver. As shown in FIG. 8, transmitter circuit 800 may include a positive-supply voltage 802, a transistor 804, a transistor 805, a transistor 806, a transistor 808, a transistor 809, a transistor 810, a ground 812, a capacitive element 813, and an output 814. In this example, output 814 may be coupled to a receiver (e.g., an unterminated receiver) via a transmission line 816. In some examples, transistors 804, 805, and 806 may represent or include p-type transistors such as p-type metal-oxide-semiconductor field-effect transistors (MOSFETs), and transistors 808, 809, and 810 may represent or include n-type transistors such as n-type MOSFETs.

In some examples, transmitter circuit 800 may include a digital-to-analog converter 820 coupled to a gate 818 of transistor 804 and a digital-to-analog converter 826 coupled to a gate 824 of transistor 810. Digital-to-analog converter 820 may be calibrated or tuned via an input 822 to apply a pre-bias voltage to gate 818 of transistor 804 to control an amount of current flowing through transistor 804 and/or a charging rate of output 814 when transistor 804 is coupled to output 814 via transistor 806. Digital-to-analog converter 826 may also be calibrated or tuned via an input 828 to apply a pre-bias voltage to gate 824 of transistor 810 to control an amount of current flowing through transistor 810 and/or a discharging rate of output 814 when transistor 810 is coupled to output 814 via transistor 808. As shown, transistor 804 and digital-to-analog converter 820 may act together as a current source for charging output 814, and transistor 810 and digital-to-analog converter 826 may act together as a current sink for discharging output 814.

In transmitter circuit 800, transistor 806 may act as a first signal-controlled switch to couple or decouple transistor 804 to or from output 814 responsive to control signaling applied to a gate 830 of transistor 806. Likewise, transistor 808 may act as a second signal-controlled switch to couple or decouple transistor 810 to or from output 814 responsive to control signaling applied to a gate 832 of transistor 808. Additionally, transistor 805 may act as a third signal-controlled switch to couple or decouple positive-supply voltage 702 to or from output 814 responsive to control signaling applied to a gate 831 of transistor 805. Likewise, transistor 809 may act as a fourth signal-controlled switch to couple or decouple ground 712 to or from output 814 responsive to control signaling applied to a gate 833 of transistor 809.

In some examples, capacitive element 813 may represent or include one or more capacitors that may be charged or discharged via transistor 804, 805, 809, or 810 to vary the amplitude of a signal at output 814. Additionally or alternatively, capacitive elements 813 may represent a capacitance of one or more elements of transmitter circuit 800 that may enable output 814 to be charged or discharged via transistor 804, 805, 809, or 810 to vary the amplitude of a signal at output 814.

Transmitter circuit 800 may include a finite-state-machine (FSM) driver 834 configured to apply control signaling to gates 830, 831, 832, and 833 of transistors 806, 805, 808, and 809, respectively. FSM driver 834 may modulate the amplitude of a signal on output 814 according to a signal received via an input 836 by varying signals on control output 830, which may control transistor 806, by varying signals on control output 831, which may control transistor 805, by varying signals on control output 832, which may control transistor 808, and by varying signals on control output 833, which may control transistor 809. In the 4-level PAM examples described herein, input 836 may represent a 2-bit input. In some examples, FSM driver 834 may include a clock input 838 through which state transitions may be triggered.

In some examples, FSM driver 834 may close transistor 806 in order to couple transistor 804 to output 814 and increase the amplitude of the signal at output 814. Similarly, FSM driver 834 may close transistor 808 in order to couple transistor 810 to output 814 and decrease the amplitude of the signal at output 814. In some examples, transistors 804 and 810 may be calibrated or tuned to provide or sink constant or otherwise predictable currents, and FSM driver 834 may close and open transistors 804 and 808 for calibrated durations suitable to charge or discharge output 814 from one amplitude state to another. In some examples, FSM driver 834 may close transistor 805 in order to couple positive-supply voltage 802 to output 814 and set the amplitude of the signal at output 814 equal to the voltage level of positive-supply voltage 802. Similarly, FSM driver 834 may close transistor 809 in order to couple ground 112 to output 814 and set the amplitude of the signal at output 814 equal to the voltage level of ground 812. In some examples, FSM driver 834 may close and open transistors 805 and 809 for durations suitable to charge or discharge output 814 to the voltage levels of positive-supply voltage 802 or ground 812 from any other possible amplitude level of output 814. FSM driver 834 may apply pulsed control signals (e.g., as illustrated in FIG. 5) to gates 830 and 832 to control transistors 806 and/or 808, respectively, and modulate a signal on output 814.

Using signal 200 in FIG. 2 as an example, FSM driver 834 may apply a temporarily low control signal to gate 831 of transistor 805 to transition signal 200 to amplitude 202 from any one of amplitude 204, 206, and 208. FSM driver 834 may apply control signal 502 to gate 832 of transistor 806 to close transistor 806 and transition signal 200 from amplitude 208 to amplitude 206 or from amplitude 206 to amplitude 204. Control signal 502 may have a pulse duration 504 calibrated to allow a current supplied by transistor 804 to charge output 814 from amplitude 208 to amplitude 206 or from amplitude 206 to amplitude 204. FSM driver 834 may apply control signals 514 to gate 832 of transistor 808 to close transistor 808 and transition signal 200 from amplitude 202 to amplitude 204 or from amplitude 204 to amplitude 206. Control signal 514 may have a pulse duration 516 calibrated to allow a current sinked by transistor 810 to discharge output 814 from amplitude 202 to amplitude 204 or from amplitude 204 to amplitude 206.

FSM driver 834 may apply control signal 506 to gate 830 of transistor 806 to transition signal 200 from amplitude 208 to amplitude 204. Control signal 506 may have a pulse duration 508 calibrated to allow a current supplied by transistor 804 to charge output 814 from amplitude 208 to amplitude 204. FSM driver 834 may apply control signal 518 to gate 832 of transistor 808 to transition signal 200 from amplitude 202 to amplitude 206. Control signal 518 may have a pulse duration 520 calibrated to allow a current sinked by transistor 810 to discharge output 814 from amplitude 202 to amplitude 206. FSM driver 834 may apply a temporarily high control signal to gate 833 of transistor 809 to transition signal 200 to amplitude 208 from any one of amplitude 202, 204, and 206. When a change to the signal on output 814 is not needed, FSM driver 834 may apply a constant high control signal to transistors 805 and 806 and a constant low control signal to transistors 808 and 809.

Figure 9:
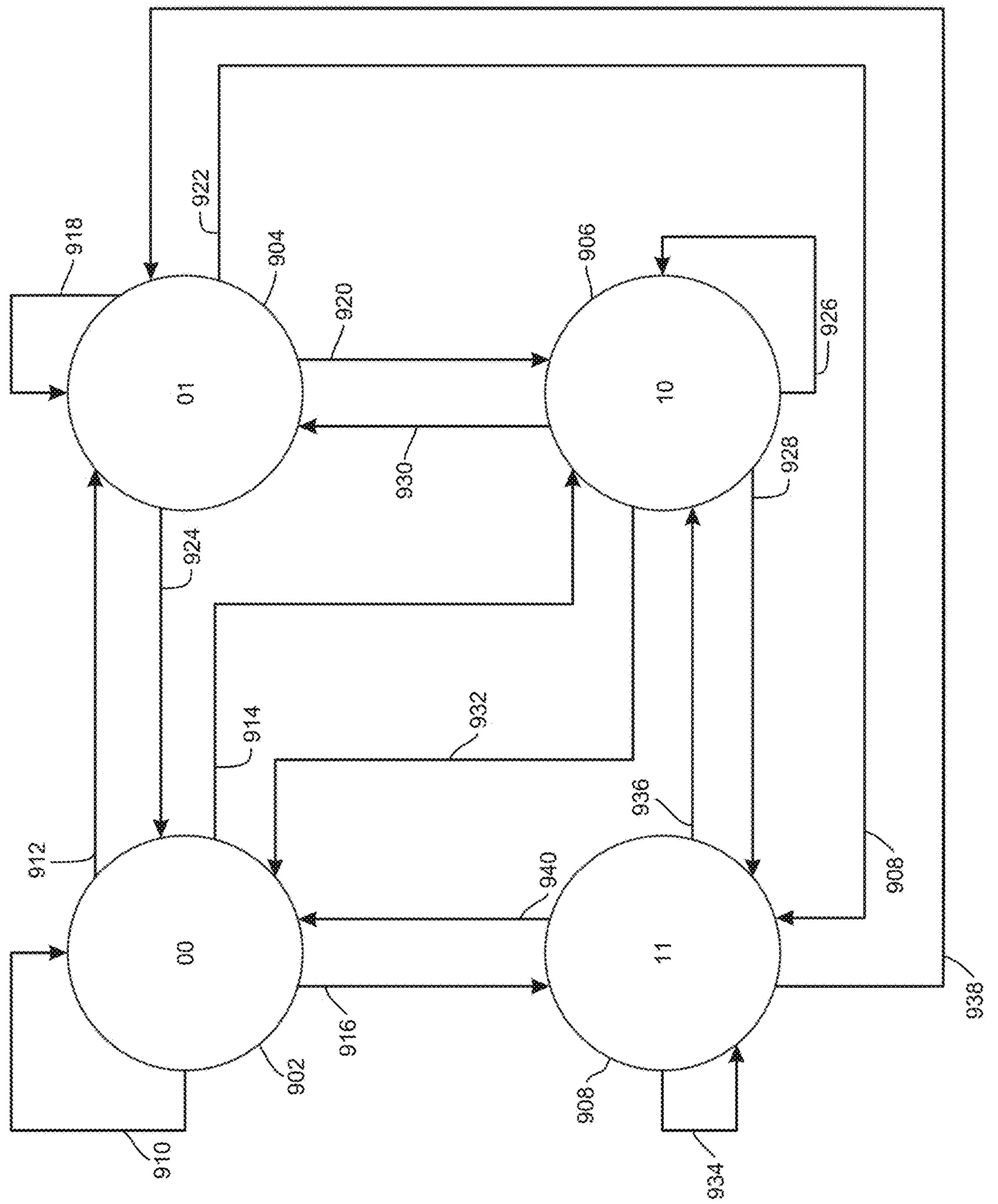
FIG. 9 is an illustration of an exemplary finite-state machine for controlling a transmitter circuit according to embodiments of this disclosure.

FIG. 9 is an illustration of an exemplary finite-state machine 900 of FSM driver 834. As shown, exemplary finite-state machine 900 may include 4 states: a state 902, a state 904, a state 906, and a state 908 that represent four possible levels of a 4-level PAM output signal. FSM driver 834 may be triggered by a clock signal applied to clock input 838 to transition from one state of finite-state machine 900 to another and apply control signals to gates 830, 831, 832, and 833 of transistors 806, 805, 808, and 809 based on a state of an input signal applied to input 836 as will be described in greater detail below. As mentioned throughout this disclosure, 4-level PAM is one of many possible embodiments of the present disclosure, and the disclosed transmitter and driver circuits may be modified to transmit any number of PAM levels using the methods and techniques disclosed herein.

State 902 may represent a first or lowest output state of a signal on output 814 (e.g., 00) corresponding to a first or lowest input state of a signal on input 836 (e.g., 00). When triggered by a clock signal on clock input 838, FSM driver 834 may take one of four transitions from state 902 and may apply control signaling based on the input signal on input 836. For example, FSM driver 834 may take a transition 910 from state 902 to state 902 when the signal on input 836 has remained 00. During transition 910, FSM driver 834 may apply a constant high control signal to transistor 805, 806, and 809 and a constant low control signal to transistor 806 such that the amplitude of output 814 maintains the voltage level of ground 812 representing 00. FSM driver 834 may take a transition 912 from state 902 to state 904 when the signal on input 836 has transitioned from 00 to 01. During transition 912, FSM driver 834 may apply control signal 502 to gate 830 of transistor 806 while applying a constant high control signal to gate 831 of transistor 805 and a constant low control signal to gate 832 of transistor 808 and gate 833 of transistor 809 such that output 814 is charged by a current supplied by transistor 804 from an amplitude representing 00 to an amplitude representing 01 and no charging or discharging occurs through transistors 805, 808, or 809. FSM driver 834 may take a transition 914 from state 902 to state 906 when the signal on input 836 has transitioned from 00 to 10. During transition 914, FSM driver 834 may apply control signal 506 to gate 830 of transistor 806 while applying a constant high control signal to gate 831 of transistor 805 and a constant low control signal to gate 832 of transistor 808 and gate 833 of transistor 809 such that output 814 is charged by a current supplied by transistor 804 from an amplitude representing 00 to an amplitude representing 10 and no charging or discharging occurs through transistors 805, 808, or 809. FSM driver 834 may take a transition 916 from state 902 to state 908 when the signal on input 836 has transitioned from 00 to 11. During transition 916, FSM driver 834 may apply a constant low control signal to gate 831 of transistor 805 while applying a constant high control signal to gate 830 of transistor 806 and a constant low control signal to gate 832 of transistor 808 and gate 833 of transistor 809 such that output 814 is charged by positive-supply voltage 802 from an amplitude representing 00 to an amplitude representing 11 and no charging or discharging occurs through transistors 806, 808, or 809.

State 904 may represent a second or second lowest output state of a signal on output 814 (e.g., 01) corresponding to a second or second lowest input state of a signal on input 836 (e.g., 01). When triggered by a clock signal on clock input 838, FSM driver 834 may take one of four transitions from state 904 and may apply control signaling based on the input signal on input 836. For example, FSM driver 834 may take a transition 918 from state 904 to state 904 when the signal on input 836 has remained 01. During transition 918, FSM driver 834 may apply a constant high control signal to the gates of transistors 805 and 806 and a constant low control signal to the gates of transistors 808 and 809. FSM driver 834 may take a transition 920 from state 904 to state 906 when the signal on input 836 has transitioned from 01 to 10. During transition 920, FSM driver 834 may apply control signal 502 to gate 830 of transistor 806 while applying a constant high control signal to gate 831 of transistor 805 and a constant low control signal to gate 832 of transistor 808 and gate 833 of transistor 809 such that output 814 is charged by a current supplied by transistor 804 from an amplitude representing 01 to an amplitude representing 10 and no charging or discharging occurs through transistors 805, 808, or 809. FSM driver 834 may take a transition 922 from state 904 to state 908 when the signal on input 836 has transitioned from 01 to 11. During transition 912, FSM driver 834 may apply control signal 506 to gate 830 of transistor 806 while applying a constant high control signal to gate 831 of transistor 805 and a constant low control signal to gate 832 of transistor 808 and gate 833 of transistor 809 such that output 814 is charged by a current supplied by transistor 804 from an amplitude representing 01 to an amplitude representing 11 and no charging or discharging occurs through transistors 805, 808, or 809. FSM driver 834 may take a transition 924 from state 904 to state 902 when the signal on input 836 has transitioned from 01 to 00. During transition 924, FSM driver 834 may apply control signal 514 to gate 832 of transistor 808 while applying a constant high control signal to gate 830 of transistor 806 and gate 831 of transistor 805 and a constant low control signal to gate 833 of transistor 809 such that output 814 is discharged by a current sinked by transistor 810 from an amplitude representing 01 to an amplitude representing 00 and no charging or discharging occurs through transistor 805, 806, or 809.

State 906 may represent a third or third lowest output state of a signal on output 814 (e.g., 10) corresponding to a third or third lowest input state of a signal on input 836 (e.g., 10). When triggered by a clock signal on clock input 838, FSM driver 834 may take one of four transitions from state 906 and may apply control signaling based on the input signal on input 836. For example, FSM driver 834 may take a transition 926 from state 906 to state 906 when the signal on input 836 has remained 10. During transition 926, FSM driver 834 may apply a constant high control signal to the gates of transistors 805 and 806 and a constant low control signal to the gates of transistors 808 and 809. FSM driver 834 may take a transition 928 from state 906 to state 908 when the signal on input 836 has transitioned from 10 to 11. During transition 928, FSM driver 834 may apply control signal 502 to gate 830 of transistor 806 while applying a constant high control signal to gate 831 of transistor 805 and a constant low control signal to gate 832 of transistor 808 and gate 833 of transistor 809 such that output 814 is charged by a current supplied by transistor 804 from an amplitude representing 10 to an amplitude representing 11 and no charging or discharging occurs through transistor 805, 808, and 809. FSM driver 834 may take a transition 930 from state 906 to state 904 when the signal on input 836 has transitioned from 10 to 01. During transition 930, FSM driver 834 may apply control signal 514 to gate 832 of transistor 808 while applying a constant high control signal to gate 830 of transistor 806 and gate 831 of transistor 805 and a constant low control signal to gate 833 of transistor 809 such that output 814 is discharged by a current sinked by transistor 810 from an amplitude representing 10 to an amplitude representing 01 and no charging or discharging occurs through transistor 805, 806, or 809. FSM driver 834 may take a transition 932 from state 906 to state 902 when the signal on input 836 has transitioned from 10 to 00. During transition 932, FSM driver 834 may apply a constant high control signal to gate 830 of transistor 806, gate 831 of transistor 805, and gate 833 of transistor 809 and a constant low control signal to gate 832 of transistor 808 such that output 814 is discharged by ground 812 through transistor 809 from an amplitude representing 10 to an amplitude representing 00 and no charging or discharging occurs through transistors 805, 806, or 810.

State 908 may represent a fourth or highest output state of a signal on output 814 (e.g., 11) corresponding to a fourth or highest input state of a signal on input 836 (e.g., 11). When triggered by a clock signal on clock input 838, FSM driver 834 may take one of four transitions from state 908 and may apply control signaling based on the input signal on input 836. For example, FSM driver 834 may take a transition 934 from state 908 to state 908 when the signal on input 836 has remained 11. During transition 934, FSM driver 834 may apply a constant high control signal to transistor 806 and a constant low control signal to transistors 805, 808, and 809 such that the amplitude of output 814 maintains the voltage level of positive-supply voltage 802 representing 11. FSM driver 834 may take a transition 936 from state 908 to state 906 when the signal on input 836 has transitioned from 11 to 10. During transition 936, FSM driver 834 may apply control signal 514 to gate 832 of transistor 808 while applying a constant high control signal to gate 830 of transistor 806 and gate 831 of transistor 805 and a constant low control signal to gate 833 of transistor 809 such that output 814 is discharged by a current sinked by transistor 810 from an amplitude representing 11 to an amplitude representing 10 and no charging or discharging occurs through transistors 805, 806, or 809. FSM driver 834 may take a transition 938 from state 908 to state 904 when the signal on input 836 has transitioned from 11 to 01. During transition 938, FSM driver 834 may apply control signal 518 to gate 832 of transistor 808 while applying a constant high control signal to gate 830 of transistor 806 and gate 831 of transistor 805 and a constant low control signal to gate 833 of transistor 809 such that output 814 is discharged by a current sinked by transistor 810 from an amplitude representing 11 to an amplitude representing 01 and no charging or discharging occurs through transistors 805, 806, or 809. FSM driver 834 may take a transition 940 from state 908 to state 902 when the signal on input 836 has transitioned from 11 to 00. During transition 934, FSM driver 834 may apply a constant high control signal to gate 830 of transistor 806, gate 831 of transistor 805, and gate 833 of transistor 809 and a constant low control signal to gate 832 of transistor 808 such that output 814 is discharged by ground 812 through transistor 809 from an amplitude representing 11 to an amplitude representing 00 and no charging or discharging occurs through transistors 805, 806, or 810.

FIG. 10 is a flowchart of an example method for modulating output states of one or more of the transmitter circuits described herein to mirror input states. At step 1010, a driver may detect a first input state of an input of the transmitter circuit. For example, driver 116 in FIG. 1 may detect a first input state of input 118 of transmitter circuit 100. At step 1020, a driver may change the output of the transmitter circuit to a first output state corresponding to the first input state of the input by electrically coupling, via a first switch, a current source to the output. For example, driver 116 in FIG. 1 may change output 114 of transmitter circuit 100 to a first output state corresponding to the first input state of input 118 by electrically coupling, via signal controlled switch 106, current source 104 to output 114. At step 1030, a driver may detect a second input state of the input. For example, driver 116 in FIG. 1 may detect a second input state of input 118 of transmitter circuit 100. At step 1040, a driver may change the output to a second output state corresponding to the second input state of the input by electrically coupling, via a second switch, a current sink to the output. For example, driver 116 in FIG. 1 may change output 114 of transmitter circuit 100 to a second output state corresponding to the second input state of input 118 by electrically coupling, via signal controlled switch 108, current sink 110 to output 114.

EXAMPLE EMBODIMENTS

Example 1: An apparatus including: an input; an output; a current source; a first switch configured to electrically couple the current source to the output; a current sink; a second switch configured to electrically couple the current sink to the output; and a driver configured to modulate states of the output to reflect states of the input by: detecting a first input state of the input; changing the output to a first output state corresponding to the first input state of the input by electrically coupling, via the first switch, the current source to the output; detecting a second input state of the input; and changing the output from the first output state to a second output state corresponding to the second input state of the input by electrically coupling, via the second switch, the current sink to the output.

Example 2: The apparatus of Example 1 further including: a positive voltage source; and a third switch configured to electrically couple the positive voltage source to the output, wherein the driver is further configured to: detect a third input state of the input; and change the output from the second output state to a third output state corresponding to the third input state of the input by electrically coupling, via the third switch, the positive voltage source to the output.

Example 3: The apparatus of any of Examples 1 and 2 where the third switch includes a p-type metal-oxide-semiconductor field-effect transistor.

Example 4: The apparatus of any of Examples 1-3 further including: a negative voltage source; and a third switch configured to electrically couple the negative voltage source to the output, wherein the driver is further configured to: detect a third input state of the input; and change the output from the second output state to a third output state corresponding to the third input state of the input by electrically coupling, via the third switch, the negative voltage source to the output.

Example 5: The apparatus of any of Examples 1~4 where the third switch includes an n-type metal-oxide-semiconductor field-effect transistor.

Example 6: The apparatus of any of Examples 1-5 where the current source is configured to supply a predetermined amount of current over a predetermined time interval; and the driver is configured to change the output to the first output state corresponding to the first input state of the input by electrically coupling, via the first switch, the current source to the output for the predetermined time interval, the predetermined amount of current being sufficient to change the output from a prior output state to the first output state.

Example 7: The apparatus of any of Examples 1-6 where the current sink is configured to sink a predetermined amount of current over a predetermined time interval; and the driver is configured to change the output to the second output state corresponding to the second input state of the input by electrically coupling, via the second switch, the current sink to the output for the predetermined time interval, the predetermined amount of current being sufficient to change the output from the first output state to the second output state.

Example 8: The apparatus of any of Examples 1-7 where the current source and the first switch each include a p-type metal-oxide-semiconductor field-effect transistor; and the current sink and the second switch each include an n-type metal-oxide-semiconductor field-effect transistor.

Example 9: The apparatus of any of Examples 1-8 where the states of the output include a pulse-amplitude modulated signal with four or more levels.

Example 10: A system including: a transmission line having a transmitting end and a receiving end; a receiver electrically coupled to the receiving end of the transmission line; and a transmitter including: an input; an output electrically coupled to the transmitting end of the transmission line; a current source; a first switch configured to electrically couple the current source to the output; a current sink; a second switch configured to electrically couple the current sink to the output; and a driver configured to modulate states of the output to reflect states of the input by: detecting an input state of the input; changing the output to an output state corresponding to the input state of the input by: electrically coupling, via the first switch, the current source to the output; or electrically coupling, via the second switch, the current sink to the output.

Example 11: The system of Example 10 further including: a first die, the receiver forming a part of the first die; a second die, the transmitter forming a part of the second die, wherein: the transmission line is a die-to-die interconnect; and the receiver is an unterminated receiver.

Example 12: The system of any of Examples 10 and 11 where the second die further includes: a positive voltage source; and a third switch configured to electrically couple the positive voltage source to the output, wherein the driver is further configured to: detect an additional input state of the input; and change the output from the output state to an additional output state corresponding to the additional input state of the input by electrically coupling, via the third switch, the positive voltage source to the output.

Example 13: The system of any of Examples 10-12 where the third switch includes a p-type metal-oxide-semiconductor field-effect transistor.

Example 14: The system of any of Examples 10-13 where the second die further includes: a negative voltage source; and a third switch configured to electrically couple the negative voltage source to the output, wherein: the driver is further configured to: detect an additional input state of the input; and change the output from the output state to an additional output state corresponding to the additional input state of the input by electrically coupling, via the third switch, the negative voltage source to the output.

Example 15: The system of any of Examples 10-14 where the third switch includes an n-type metal-oxide-semiconductor field-effect transistor.

Example 16: The system of any of Examples 10-15 where the current source is configured to supply a predetermined amount of current over a predetermined time interval; and the driver is configured to change the output to the output state corresponding to the input state of the input by electrically coupling, via the first switch, the current source to the output for the predetermined time interval, the predetermined amount of current being sufficient to change the output from a prior output state to the output state.

Example 17: The system of any of Examples 10-16 where the current sink is configured to sink a predetermined amount of current over a predetermined time interval; and the driver is configured to change the output to the output state corresponding to the input state of the input by electrically coupling, via the second switch, the current sink to the output for the predetermined time interval, the predetermined amount of current being sufficient to change the output from a prior output state to the output state.

Example 18: The system of any of Examples 10-17 where the current source and the first switch each include a p-type metal-oxide-semiconductor field-effect transistor; and the current sink and the second switch each include an n-type metal-oxide-semiconductor field-effect transistor.

Example 19: A method for modulating an output of a transmitter, the method including: detecting a first input state of an input of the transmitter; changing the output to a first output state corresponding to the first input state of the input by electrically coupling, via a first switch, a current source to the output; detecting a second input state of the input; and changing the output to a second output state corresponding to the second input state of the input by electrically coupling, via a second switch, a current sink to the output.

Example 20: The method of Example 19 further including: detecting a third input state of the input; changing the output to a third output state corresponding to the third input state of the input by electrically coupling, via a third switch, a positive voltage source to the output; detecting a fourth input state of the input; and changing the output to a fourth output state corresponding to the fourth input state of the input by electrically coupling, via a fourth switch, a negative voltage source to the output.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality-systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
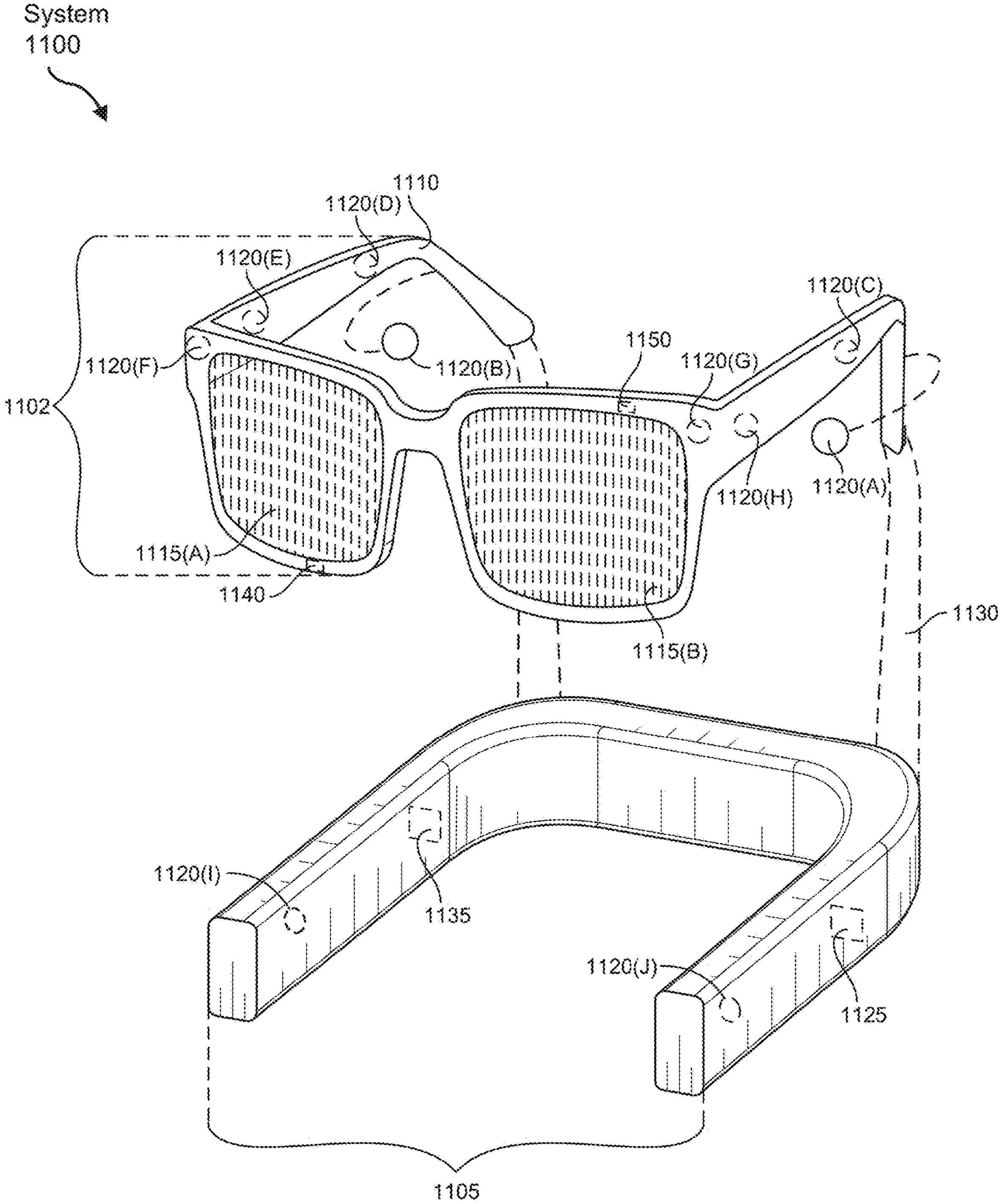
FIG. 11 is an illustration of exemplary augmented-reality glasses that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(J) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a BLUETOOTH connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium-ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1100 and 1200 of FIGS. 11 and 12, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 1100 and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
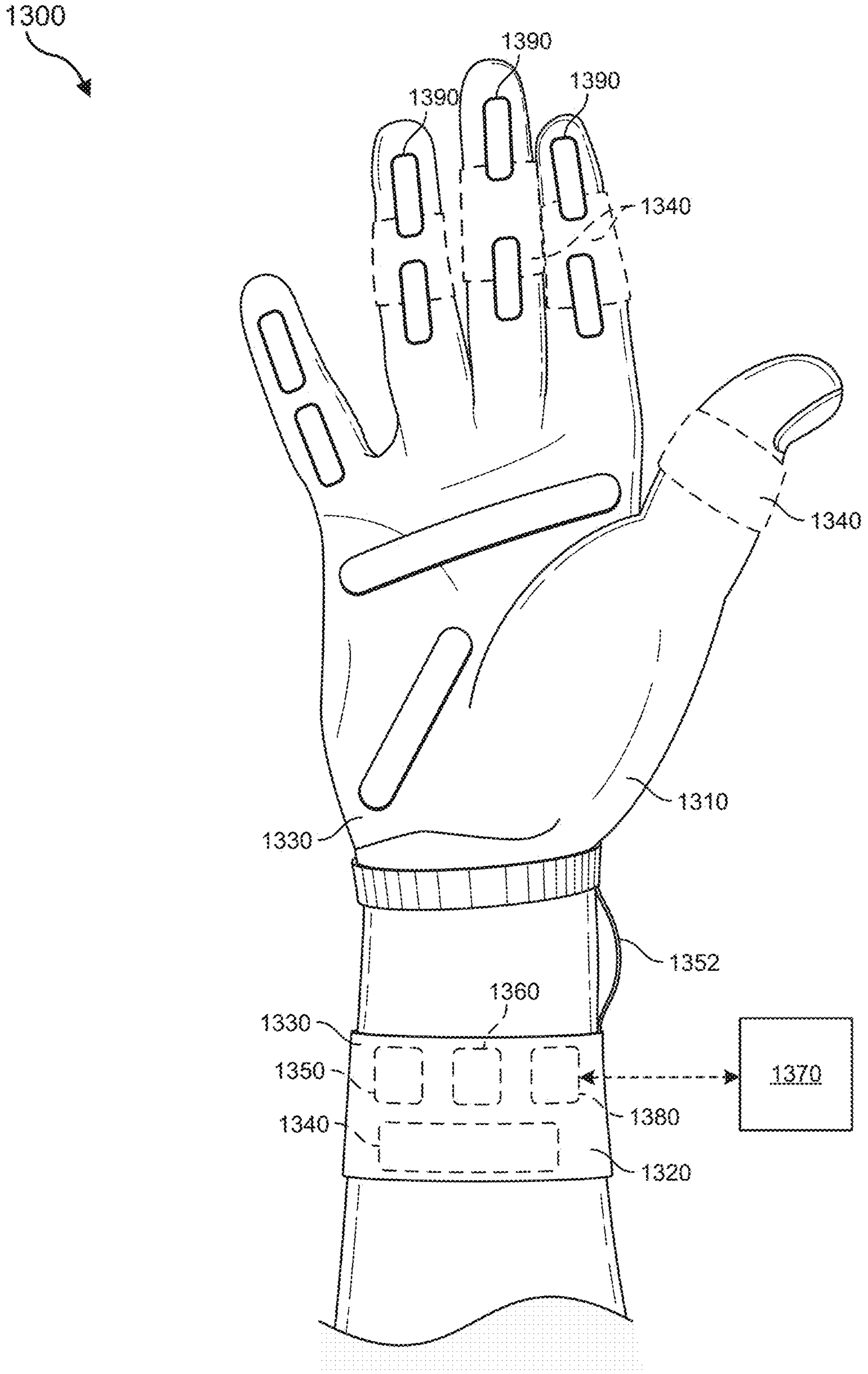
FIG. 13 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). Haptic device 1310 and haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned against the user's finger(s), thumb, or wrist, as shown in FIG. 13. Vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1380 may enable communications between vibrotactile system 1300 and the other device or system 1370 via a wireless (e.g., Wi-Fi, BLUETOOTH, cellular, radio, etc.) link or a wired link. If present, communications interface 1380 may be in communication with processor 1360, such as to provide a signal to processor 1360 to activate or deactivate one or more of the vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
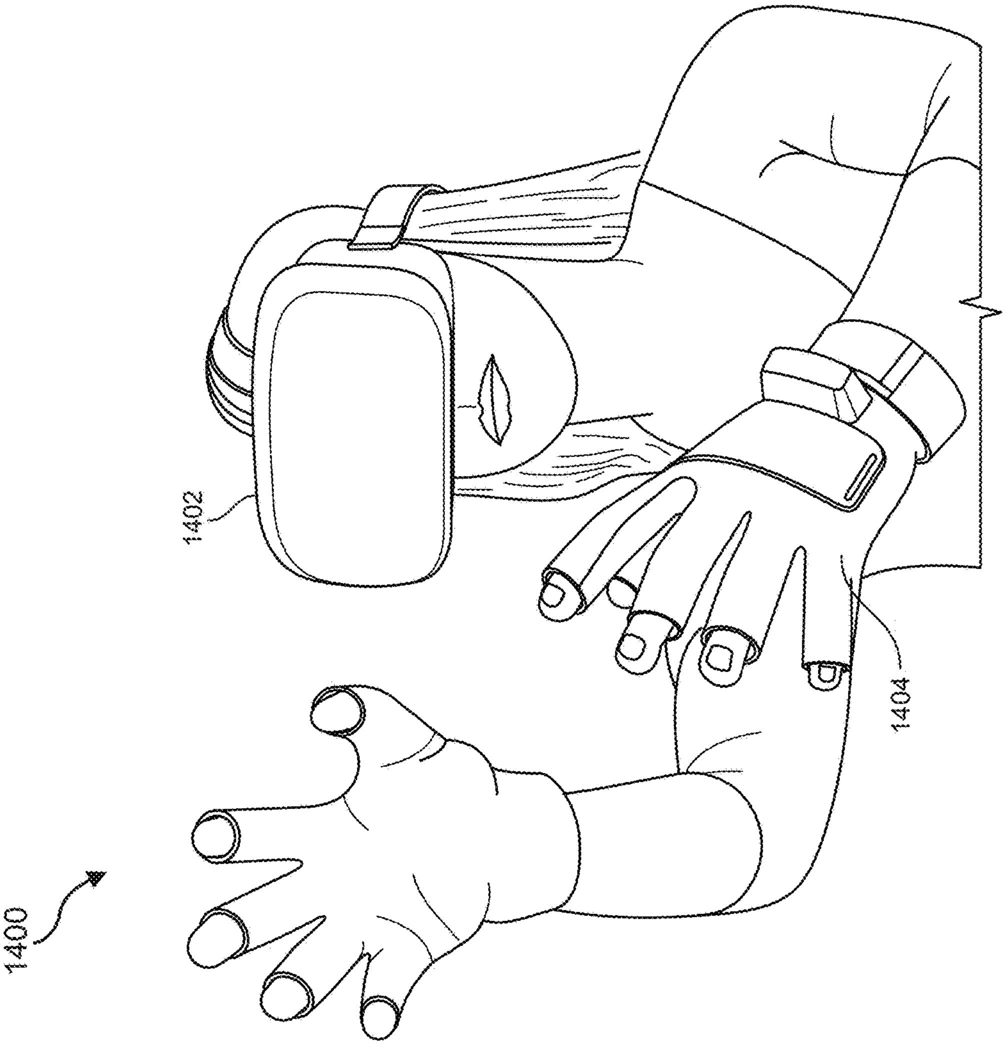
FIG. 14 is an illustration of an exemplary virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 12:
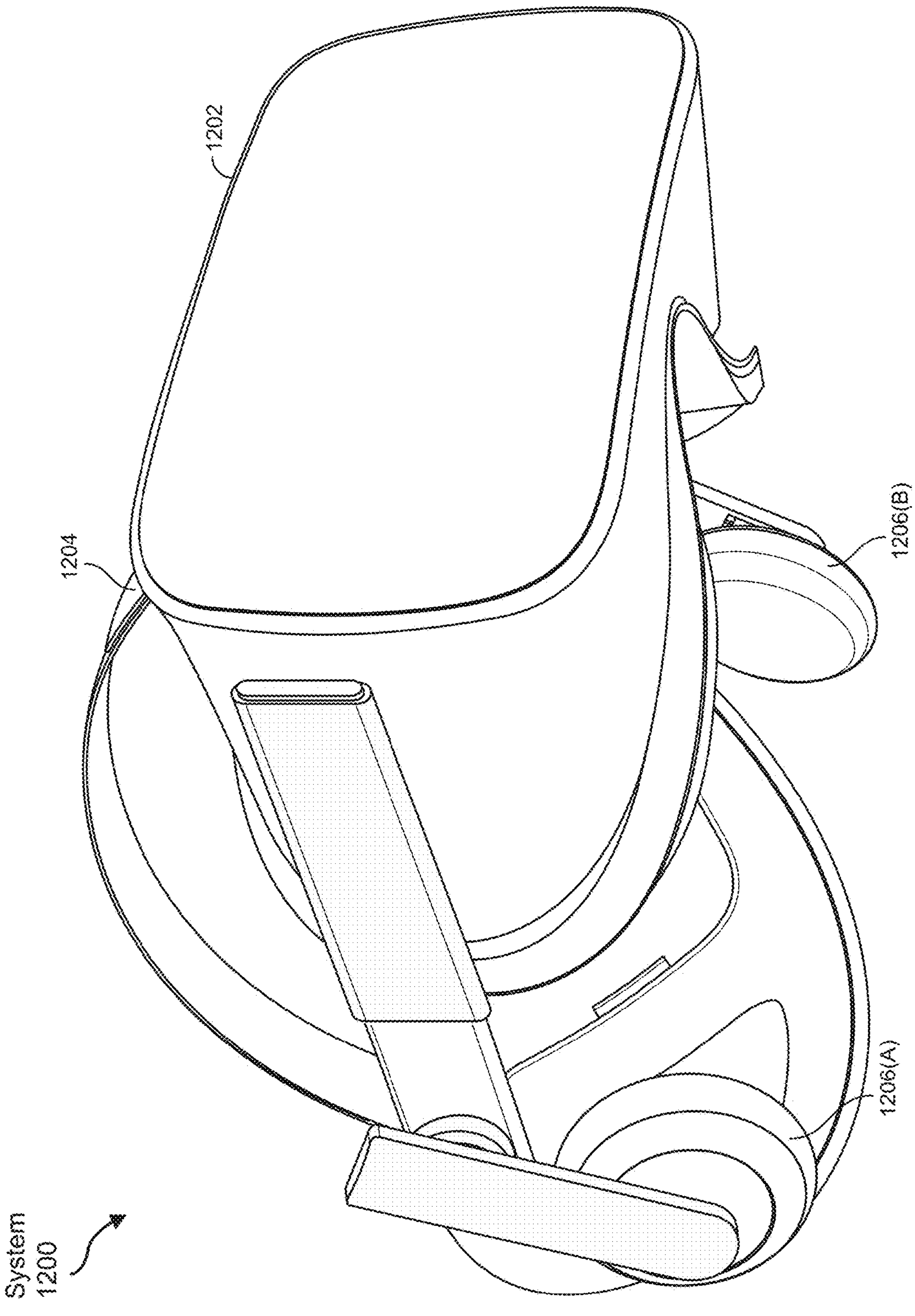
FIG. 12 is an illustration of an exemplary virtual-reality headset that may be used in connection with embodiments of this disclosure.

Head-mounted display 1402 generally represents any type or form of virtual-reality system, such as virtual-reality system 1200 in FIG. 12. Haptic device 1404 generally represents any type or form of wearable device, worn by a user of an artificial-reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

Figure 15:
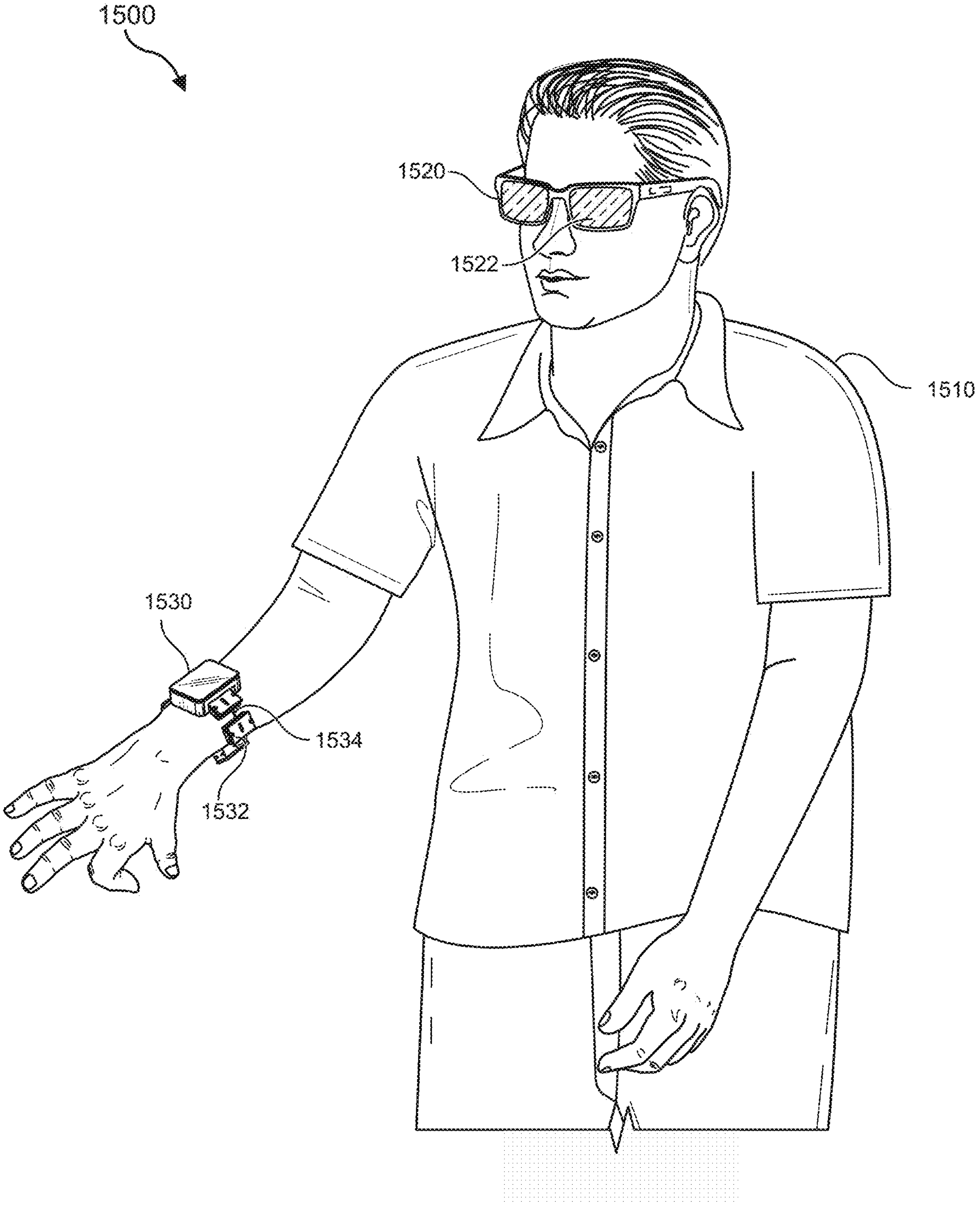
FIG. 15 is an illustration of an exemplary augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view of a user 1510 interacting with an augmented-reality system 1500. In this example, user 1510 may wear a pair of augmented-reality glasses 1520 that may have one or more displays 1522 and that are paired with a haptic device 1530. In this example, haptic device 1530 may be a wristband that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 16:
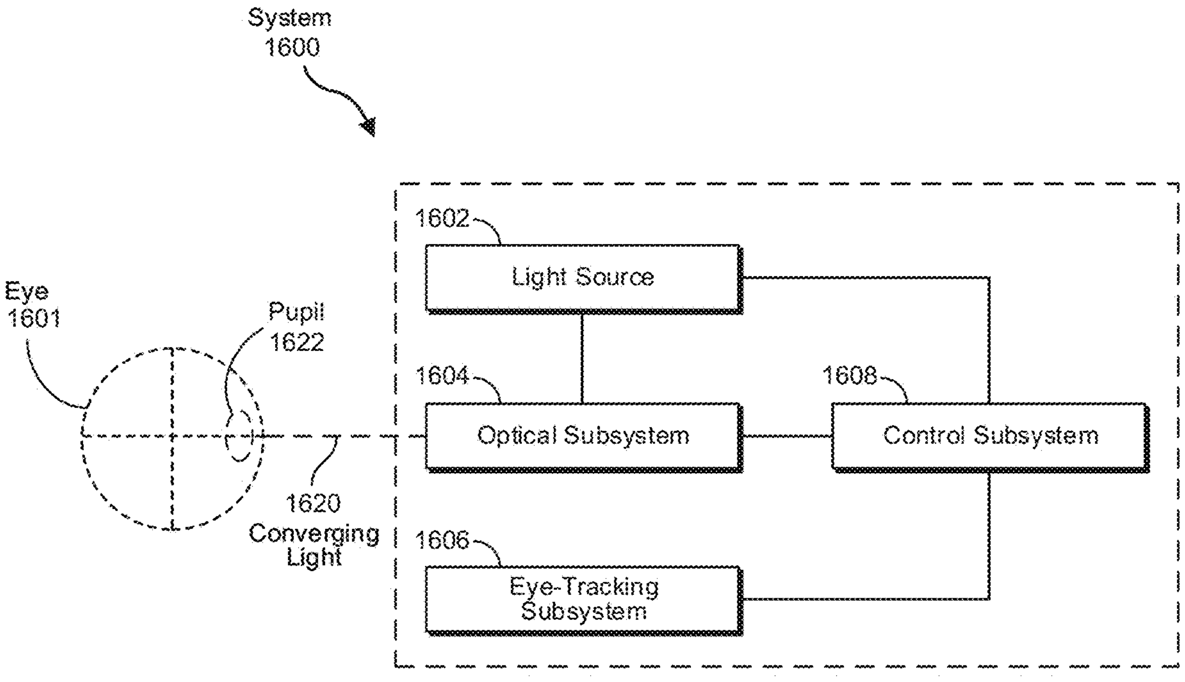
FIG. 16 an illustration of an exemplary system that incorporates an eye-tracking subsystem capable of tracking a user's eye(s).

FIG. 16 is an illustration of an exemplary system 1600 that incorporates an eye-tracking subsystem capable of tracking a user's eye(s). As depicted in FIG. 16, system 1600 may include a light source 1602, an optical subsystem 1604, an eye-tracking subsystem 1606, and/or a control subsystem 1608. In some examples, light source 1602 may generate light for an image (e.g., to be presented to an eye 1601 of the viewer). Light source 1602 may represent any of a variety of suitable devices. For example, light source 1602 can include a two-dimensional projector (e.g., a LCOS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1604 may receive the light generated by light source 1602 and generate, based on the received light, converging light 1620 that includes the image. In some examples, optical subsystem 1604 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1620. Further, various mechanical couplings may serve to maintain the relative spacing and/or the orientation of the optical components in any suitable combination.

In one embodiment, eye-tracking subsystem 1606 may generate tracking information indicating a gaze angle of an eye 1601 of the viewer. In this embodiment, control subsystem 1608 may control aspects of optical subsystem 1604 (e.g., the angle of incidence of converging light 1620) based at least in part on this tracking information. Additionally, in some examples, control subsystem 1608 may store and utilize historical tracking information (e.g., a history of the tracking information over a given duration, such as the previous second or fraction thereof) to anticipate the gaze angle of eye 1601 (e.g., an angle between the visual axis and the anatomical axis of eye 1601). In some embodiments, eye-tracking subsystem 1606 may detect radiation emanating from some portion of eye 1601 (e.g., the cornea, the iris, the pupil, or the like) to determine the current gaze angle of eye 1601. In other examples, eye-tracking subsystem 1606 may employ a wavefront sensor to track the current location of the pupil.

Any number of techniques can be used to track eye 1601. Some techniques may involve illuminating eye 1601 with infrared light and measuring reflections with at least one optical sensor that is tuned to be sensitive to the infrared light. Information about how the infrared light is reflected from eye 1601 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1606 may be digitized (i.e., converted to an electronic signal). Further, the sensor may transmit a digital representation of this electronic signal to one or more processors (for example, processors associated with a device including eye-tracking subsystem 1606). Eye-tracking subsystem 1606 may include any of a variety of sensors in a variety of different configurations. For example, eye-tracking subsystem 1606 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1606 to track the movement of eye 1601. In another example, these processors may track the movements of eye 1601 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1606 may be programmed to use an output of the sensor(s) to track movement of eye 1601. In some embodiments, eye-tracking subsystem 1606 may analyze the digital representation generated by the sensors to extract eye rotation information from changes in reflections. In one embodiment, eye-tracking subsystem 1606 may use corneal reflections or glints (also known as Purkinje images) and/or the center of the eye's pupil 1622 as features to track over time.

In some embodiments, eye-tracking subsystem 1606 may use the center of the eye's pupil 1622 and infrared or near-infrared, non-collimated light to create corneal reflections. In these embodiments, eye-tracking subsystem 1606 may use the vector between the center of the eye's pupil 1622 and the corneal reflections to compute the gaze direction of eye 1601. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1606 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1601 may act as a retroreflector as the light reflects off the retina, thereby creating a bright pupil effect similar to a red-eye effect in photography. If the illumination source is offset from the optical path, then the eye's pupil 1622 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1608 may control light source 1602 and/or optical subsystem 1604 to reduce optical aberrations (e.g., chromatic aberrations and/or monochromatic aberrations) of the image that may be caused by or influenced by eye 1601. In some examples, as mentioned above, control subsystem 1608 may use the tracking information from eye-tracking subsystem 1606 to perform such control. For example, in controlling light source 1602, control subsystem 1608 may alter the light generated by light source 1602 (e.g., by way of image rendering) to modify (e.g., pre-distort) the image so that the aberration of the image caused by eye 1601 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 17:
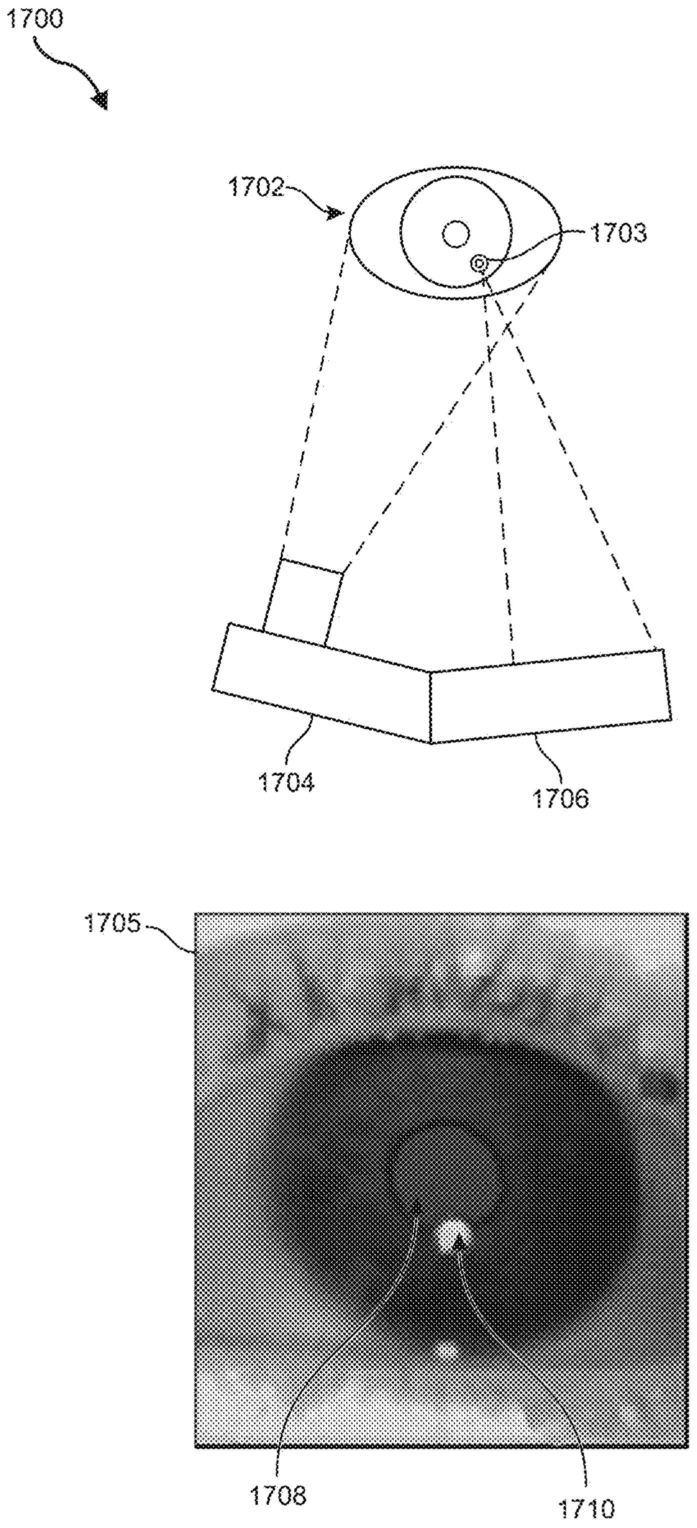
FIG. 17 is a more detailed illustration of various aspects of the eye-tracking subsystem illustrated in FIG. 16.

FIG. 17 is a more detailed illustration of various aspects of the eye-tracking subsystem illustrated in FIG. 16. As shown in this figure, an eye-tracking subsystem 1700 may include at least one source 1704 and at least one sensor 1706. Source 1704 generally represents any type or form of element capable of emitting radiation. In one example, source 1704 may generate visible, infrared, and/or near-infrared radiation. In some examples, source 1704 may radiate non-collimated infrared and/or near-infrared portions of the electromagnetic spectrum towards an eye 1702 of a user. Source 1704 may utilize a variety of sampling rates and speeds. For example, the disclosed systems may use sources with higher sampling rates in order to capture fixational eye movements of a user's eye 1702 and/or to correctly measure saccade dynamics of the user's eye 1702. As noted above, any type or form of eye-tracking technique may be used to track the user's eye 1702, including optical-based eye-tracking techniques, ultrasound-based eye-tracking techniques, etc.

Sensor 1706 generally represents any type or form of element capable of detecting radiation, such as radiation reflected off the user's eye 1702. Examples of sensor 1706 include, without limitation, a charge coupled device (CCD), a photodiode array, a complementary metal-oxide-semiconductor (CMOS) based sensor device, and/or the like. In one example, sensor 1706 may represent a sensor having predetermined parameters, including, but not limited to, a dynamic resolution range, linearity, and/or other characteristic selected and/or designed specifically for eye tracking.

As detailed above, eye-tracking subsystem 1700 may generate one or more glints. As detailed above, a glint 1703 may represent reflections of radiation (e.g., infrared radiation from an infrared source, such as source 1704) from the structure of the user's eye. In various embodiments, glint 1703 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 17 shows an example image 1705 captured by an eye-tracking subsystem, such as eye-tracking subsystem 1700. In this example, image 1705 may include both the user's pupil 1708 and a glint 1710 near the same. In some examples, pupil 1708 and/or glint 1710 may be identified using an artificial-intelligence-based algorithm, such as a computer-vision-based algorithm. In one embodiment, image 1705 may represent a single frame in a series of frames that may be analyzed continuously in order to track the eye 1702 of the user. Further, pupil 1708 and/or glint 1710 may be tracked over a period of time to determine a user's gaze.

In one example, eye-tracking subsystem 1700 may be configured to identify and measure the inter-pupillary distance (IPD) of a user. In some embodiments, eye-tracking subsystem 1700 may measure and/or calculate the IPD of the user while the user is wearing the artificial reality system. In these embodiments, eye-tracking subsystem 1700 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1600 and/or eye-tracking subsystem 1700 may be incorporated into augmented-reality system 1100 in FIG. 11 and/or virtual-reality system 1200 in FIG. 12 to enable these systems to perform various eye-tracking tasks (including one or more of the eye-tracking operations described herein).

Figure 18A:
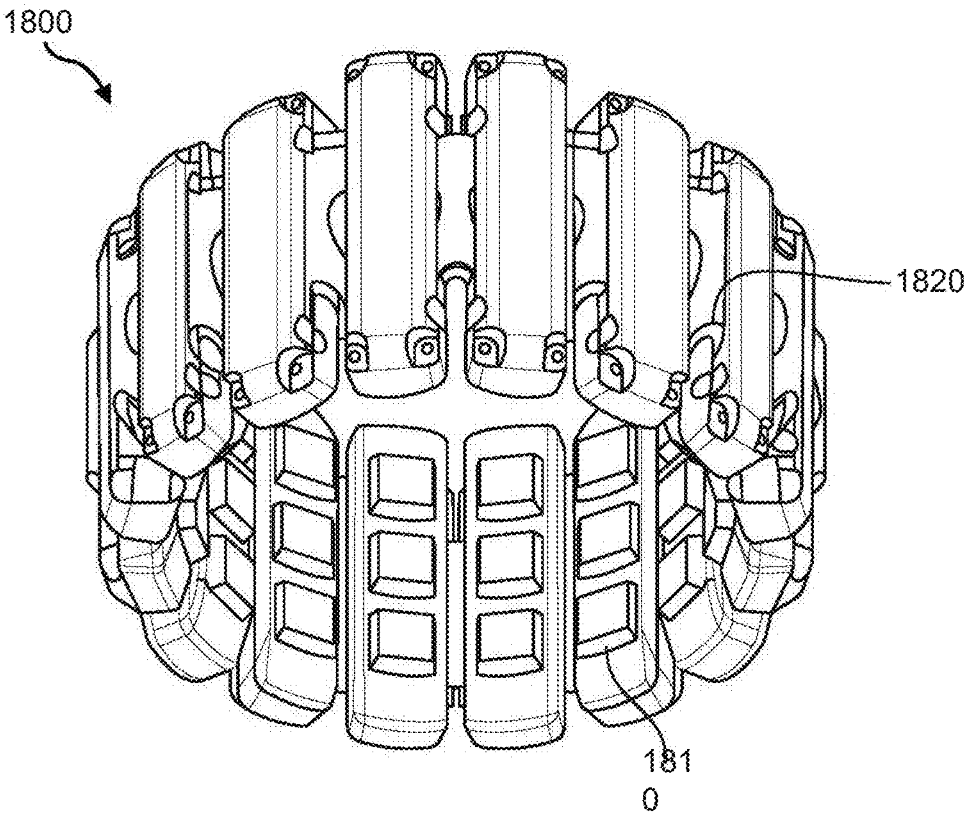
FIGS. 18A and 18B are illustrations of an exemplary human-machine interface configured to be worn around a user's lower arm or wrist.
Figure 18B:
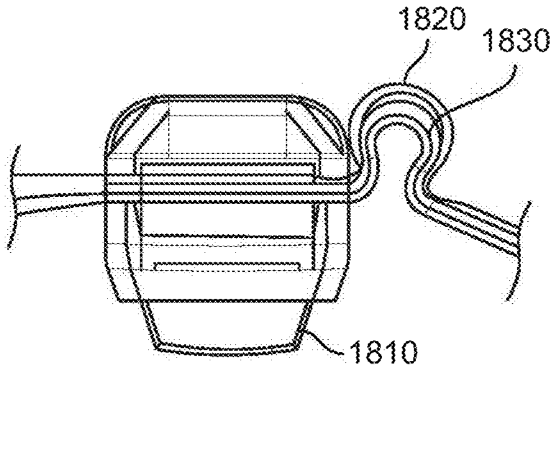

FIG. 18A illustrates an exemplary human-machine interface (also referred to herein as an EMG control interface) configured to be worn around a user's lower arm or wrist as a wearable system 1800. In this example, wearable system 1800 may include sixteen neuromuscular sensors 1810 (e.g., EMG sensors) arranged circumferentially around an elastic band 1820 with an interior surface 1830 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 18B illustrates a cross-sectional view through one of the sensors of the wearable device shown in FIG. 18A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1810 is discussed in more detail below with reference to FIGS. 19A and 19B.

Figure 19A:
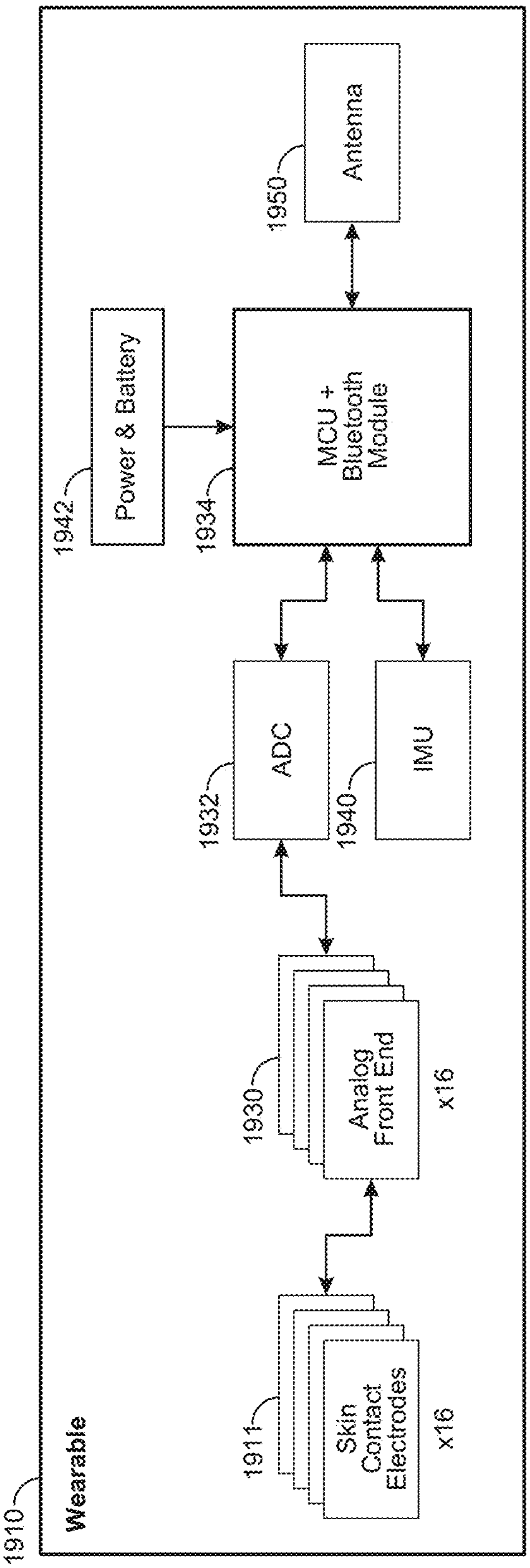
FIGS. 19A and 19B are illustrations of an exemplary schematic diagram with internal components of a wearable system.
Figure 19B:
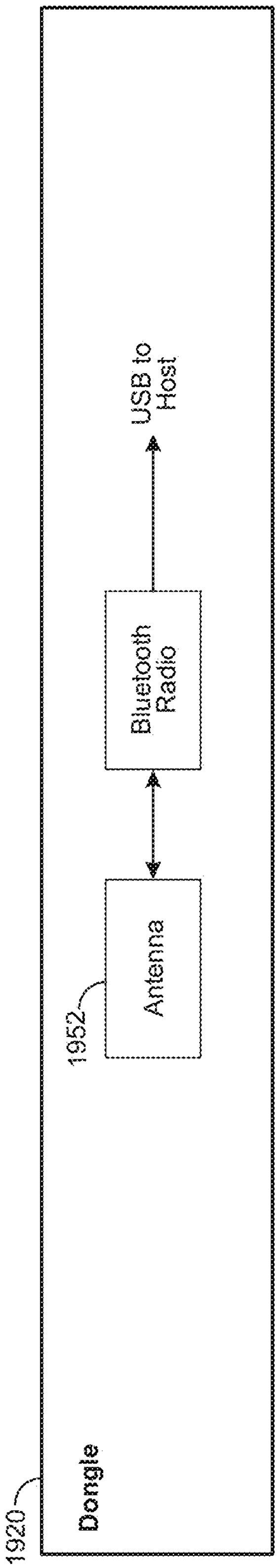

FIGS. 19A and 19B illustrate an exemplary schematic diagram with internal components of a wearable system with EMG sensors. As shown, the wearable system may include a wearable portion 1910 (FIG. 19A) and a dongle portion 1920 (FIG. 19B) in communication with the wearable portion 1910 (e.g., via BLUETOOTH or another suitable wireless communication technology). As shown in FIG. 19A, the wearable portion 1910 may include skin contact electrodes 1911, examples of which are described in connection with FIGS. 18A and 18B. The output of the skin contact electrodes 1911 may be provided to analog front end 1930, which may be configured to perform analog processing (e.g., amplification, noise reduction, filtering, etc.) on the recorded signals. The processed analog signals may then be provided to analog-to-digital converter 1932, which may convert the analog signals to digital signals that can be processed by one or more computer processors. An example of a computer processor that may be used in accordance with some embodiments is microcontroller (MCU) 1934, illustrated in FIG. 19A. As shown, MCU 1934 may also include inputs from other sensors (e.g., IMU sensor 1940), and power and battery module 1942. The output of the processing performed by MCU 1934 may be provided to antenna 1950 for transmission to dongle portion 1920 shown in FIG. 19B.

Dongle portion 1920 may include antenna 1952, which may be configured to communicate with antenna 1950 included as part of wearable portion 1910. Communication between antennas 1950 and 1952 may occur using any suitable wireless technology and protocol, non-limiting examples of which include radiofrequency signaling and BLUETOOTH. As shown, the signals received by antenna 1952 of dongle portion 1920 may be provided to a host computer for further processing, display, and/or for effecting control of a particular physical or virtual object or objects.

Although the examples provided with reference to FIGS. 18A-18B and FIGS. 19A-19B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an input state of an input to be transformed, transform the first input state of the input into a state of a combination of a current source, a current sink, and two or more switches, output a result of the transformation to the two or more switches, and use the result of the transformation to transmit from an output. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:

an input;

an output;

a current source;

a first switch configured to electrically couple the current source to the output;

a current sink;

a second switch configured to electrically couple the current sink to the output; and a driver configured to modulate states of the output to reflect states of the input by:

detecting a first input state of the input;

in response to detecting the first input state of the input, providing a first control signal to the first switch to change the output to a first output state corresponding to the first input state of the input by electrically coupling, via the first switch, the current source to the output;

detecting a second input state of the input;

in response to detecting the second input state of the input, providing a second control signal to the second switch to change the output from the first output state to a second output state corresponding to the second input state of the input by electrically coupling, via the second switch, the current sink to the output; and detecting a third input state of the input; and in response to detecting the third input state of the input, providing a third control signal to the first switch to change the output from the first output state to a third output state corresponding to the third input state of the input by electrically coupling, via the first switch, the current source to the output.

2. The apparatus of claim 1, further comprising:

a positive voltage source; and a third switch configured to electrically couple the positive voltage source to the output, wherein the driver is further configured to:

detect a fourth input state of the input; and in response to detecting the fourth input state of the input, provide a fourth control signal to the third switch to change the output from the second output state to a fourth output state corresponding to the fourth input state of the input by electrically coupling, via the third switch, the positive voltage source to the output.

3. The apparatus of claim 2, wherein the third switch comprises a p-type metal-oxide-semiconductor field-effect transistor.

4. The apparatus of claim 1, further comprising:

a ground; and a third switch configured to electrically couple the ground to the output, wherein the driver is further configured to:

detect a fourth input state of the input; and in response to detecting the fourth input state of the input, provide a fourth control signal to the third switch to change the output from the second output state to a fourth output state corresponding to the fourth input state of the input by electrically coupling, via the third switch, the ground to the output.

5. The apparatus of claim 4, wherein the third switch comprises an n-type metal-oxide-semiconductor field-effect transistor.

6. The apparatus of claim 1, wherein:

the current source is caused to supply a predetermined amount of current over a predetermined time interval; and the driver is configured to provide the first control signal to the first switch to change the output to the first output state corresponding to the first input state of the input by electrically coupling, via the first switch, the current source to the output for the predetermined time interval, the predetermined amount of current being sufficient to change the output from a prior output state to the first output state.

7. The apparatus of claim 1, wherein:
the current sink is caused to sink a predetermined amount of current over a predetermined time interval; and
the driver is configured to provide the second control signal to the second switch to change the output to the second output state corresponding to the second input state of the input by electrically coupling, via the second switch, the current sink to the output for the predetermined time interval, the predetermined amount of current being sufficient to change the output from the first output state to the second output state.

8. The apparatus of claim 1, wherein:
the current source and the first switch each comprise a p-type metal-oxide-semiconductor field-effect transistor; and
the current sink and the second switch each comprise an n-type metal-oxide-semiconductor field-effect transistor.

9. The apparatus of claim 1, wherein the states of the output comprise a pulse-amplitude modulated signal with four or more levels.

10. A system comprising:
a transmission line having a transmitting end and a receiving end;
a receiver electrically coupled to the receiving end of the transmission line; and
a transmitter comprising:
an input;
an output electrically coupled to the transmitting end of the transmission line;
a current source;
a first switch configured to electrically couple the current source to the output;
a current sink;
a second switch configured to electrically couple the current sink to the output; and
a driver configured to modulate states of the output to reflect states of the input by:
detecting an input state of the input;
in response to detecting the input state of the input, providing a respective control signal changing the output to an output state corresponding to the input state of the input by:
electrically coupling, via the first switch, the current source to the output such that the output has a first amplitude;
electrically coupling, via the second switch, the current sink to the output; or
electrically coupling, via the first switch, the current source to the output such that the output has a second amplitude distinct form the first amplitude.

11. The system of claim 10, further comprising:
a first die, the receiver forming a part of the first die;
a second die, the transmitter forming a part of the second die, wherein:
the transmission line is a die-to-die interconnect; and
the receiver is an unterminated receiver.

12. The system of claim 11, wherein the second die further comprises:
a positive voltage source; and
a third switch configured to electrically couple the positive voltage source to the output, wherein the driver is further configured to:
detect an additional input state of the input; and
in response to detecting the additional input state of the input, provide another control signal to the third switch to change the output from the output state to an additional output state corresponding to the additional input state of the input by electrically coupling, via the third switch, the positive voltage source to the output.

13. The system of claim 12, wherein the third switch comprises a p-type metal-oxide-semiconductor field-effect transistor.

14. The system of claim 11, wherein the second die further comprises:
a ground; and
a third switch configured to electrically couple the ground to the output, wherein: the driver is further configured to:
detect an additional input state of the input; and
in response to detecting the additional input state of the input, provide another control signal to the third switch to change the output from the output state to an additional output state corresponding to the additional input state of the input by electrically coupling, via the third switch, the ground to the output.

15. The system of claim 14, wherein the third switch comprises an n-type metal-oxide-semiconductor field-effect transistor.

16. The system of claim 11, wherein:
the current source is caused to supply a predetermined amount of current over a predetermined time interval; and
the driver is configured to provide the respective control signal to the first switch to change the output to the output state corresponding to the input state of the input by electrically coupling, via the first switch, the current source to the output for the predetermined time interval, the predetermined amount of current being sufficient to change the output from a prior output state to the output state.

17. The system of claim 11, wherein:
the current sink is caused to sink a predetermined amount of current over a predetermined time interval; and
the driver is configured to provide the respective control signal to the second switch to change the output to the output state corresponding to the input state of the input by electrically coupling, via the second switch, the current sink to the output for the predetermined time interval, the predetermined amount of current being sufficient to change the output from a prior output state to the output state.

18. The system of claim 11, wherein:
the current source and the first switch each comprise a p-type metal-oxide-semiconductor field-effect transistor; and
the current sink and the second switch each comprise an n-type metal-oxide-semiconductor field-effect transistor.

19. A method for modulating an output of a transmitter, the method comprising:
detecting a first input state of an input of the transmitter;
changing the output to a first output state corresponding to the first input state of the input by electrically coupling, via a first switch, a current source to the output;
detecting a second input state of the input;
changing the output to a second output state corresponding to the second input state of the input by electrically coupling, via a second switch, a current sink to the output;

detecting a third input state of the input; and changing the output to a third output state corresponding to the third input state of the input by electrically coupling, via the first switch, the current source to the output.

20. The method of claim 19, further comprising:

detecting a fourth input state of the input;

changing the output to a fourth output state corresponding to the fourth input state of the input by electrically coupling, via a third switch, a positive voltage source to the output;

detecting a fifth input state of the input; and changing the output to a fifth output state corresponding to the fifth input state of the input by electrically coupling, via a fourth switch, a ground to the output.

* * * * *